(12) United States Patent
Nakanishi et al.

(10) Patent No.: US 10,824,263 B2
(45) Date of Patent: Nov. 3, 2020

(54) DETECTION DEVICE AND DISPLAY DEVICE

(71) Applicant: Japan Display Inc., Tokyo (JP)

(72) Inventors: Takayuki Nakanishi, Tokyo (JP); Naoki Takada, Tokyo (JP); Shota Hosaka, Tokyo (JP)

(73) Assignee: Japan Display Inc., Tokyo (JP)

( * ) Notice: Subject to any disclaimer, the term of this patent is extended or adjusted under 35 U.S.C. 154(b) by 107 days.

(21) Appl. No.: 15/963,264

(22) Filed: Apr. 26, 2018

(65) Prior Publication Data

US 2018/0348950 A1 Dec. 6, 2018

(30) Foreign Application Priority Data

Jun. 5, 2017 (JP) ................. 2017-111071

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 3/0412* (2013.01); *G06F 2203/04107* (2013.01); *G06F 2203/04108* (2013.01)

(58) Field of Classification Search
CPC ...... G06F 3/0416; G06F 3/0412; G06F 3/044; G06F 2203/04108; G06F 2203/04107
See application file for complete search history.

(56) References Cited

U.S. PATENT DOCUMENTS

| 2010/0182273 | A1  | 7/2010  | Noguchi et al. |
|---|---|---|---|
| 2013/0342498 | A1  | 12/2013 | Kim et al. |
| 2014/0049486 | A1  | 2/2014  | Kim et al. |
| 2014/0049508 | A1  | 2/2014  | Kim et al. |
| 2015/0220204 | A1* | 8/2015  | Noguchi ............... G06F 3/0412 345/174 |
| 2016/0209953 | A1* | 7/2016  | Kim ...................... G06F 3/0416 |

FOREIGN PATENT DOCUMENTS

JP      2009-244958 A    10/2009

* cited by examiner

*Primary Examiner* — Alexander Eisen
*Assistant Examiner* — Kebede T Teshome
(74) *Attorney, Agent, or Firm* — K&L Gates LLP

(57) ABSTRACT

A detection device and a display device include first electrodes, second electrodes, a detector, and a coupling circuit. The first electrodes are disposed side by side in a first direction and a second direction intersecting the first direction. The second electrodes are disposed on the side facing the first electrodes and extend in the second direction. The detector receives a first detection signal output from the second electrodes based on changes in capacitance between the first electrodes and the second electrodes or a second detection signal output from the first electrodes based on changes in capacitance in the first electrodes.

9 Claims, 31 Drawing Sheets

FIG.31
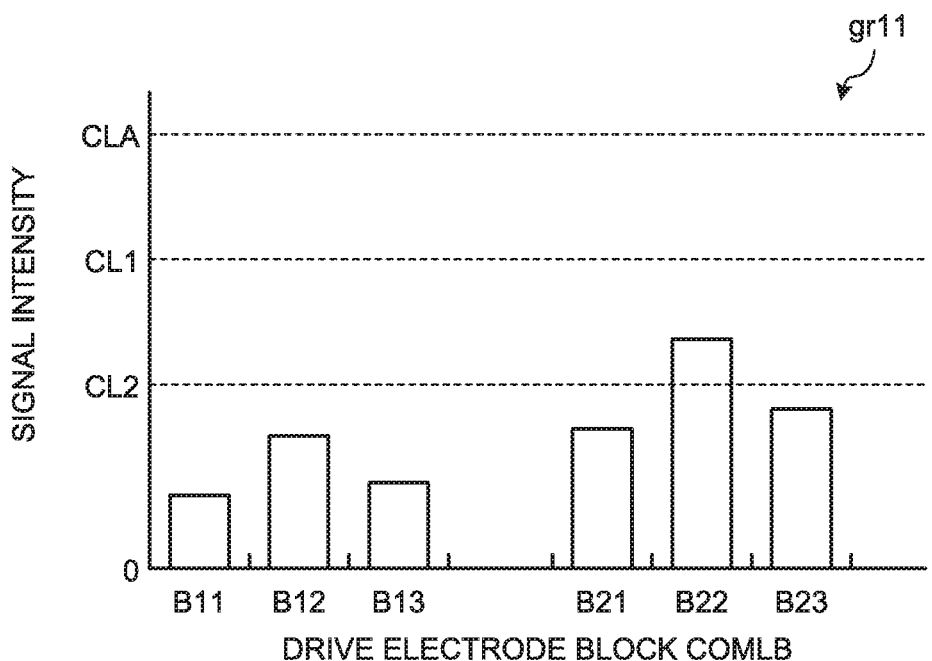
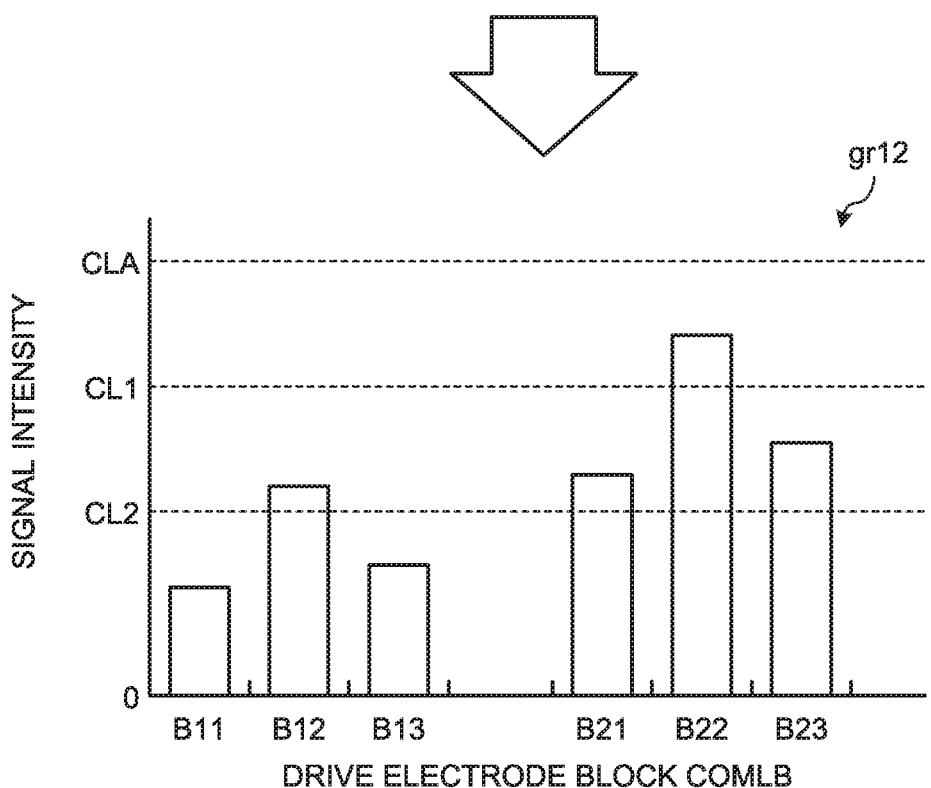

DETECTION DEVICE AND DISPLAY DEVICE

CROSS-REFERENCE TO RELATED APPLICATIONS

This application claims priority from Japanese Application No. 2017-111071, filed on Jun. 5, 2017, the contents of which are incorporated by reference herein in its entirety.

BACKGROUND

1. Technical Field

The present disclosure relates to a detection device and a display device.

2. Description of the Related Art

Touch detection devices capable of detecting an external proximity object, what are called touch panels, have recently been attracting attention. Touch panels are mounted on or integrated with a display device, such as a liquid crystal display device, and used as display devices (refer to U.S. Patent Application Publication No. 2014/0049486, U.S. Patent Application Publication No. 2013/0342498, and U.S. Patent Application Publication No. 2014/0049508, for example). Various functions of such display devices are known, including a touch detection function to detect contact of a finger of an operator with a screen and a hover detection (proximity detection) function to detect a proximity state, a gesture, or the like of the finger not in contact with the screen.

Touch detection and hover detection are significantly different in the distance between detection electrodes and an object to be detected serving as a detection target, such as a finger, and in the resolution required for the detection. If electrodes and a drive configuration for touch detection are used for hover detection without any change, it may possibly be difficult to perform hover detection satisfactorily. Increasing the area of detection electrodes is an effective way to increase the detection sensitivity in hover detection. In this case, however, the detection sensitivity in touch detection may possibly decrease.

SUMMARY

A detection device according to one embodiment includes a plurality of first electrodes disposed side by side in a first direction and a second direction intersecting the first direction, a plurality of second electrodes disposed on a side facing the first electrodes and extending in the second direction, a detector configured to receive a first detection signal output from the second electrodes based on a change in capacitance between the first electrodes and the second electrodes or a second detection signal output from the first electrodes based on a change in capacitance in the first electrodes, and a coupling circuit configured to couple the first electrodes to one another in the first direction to form a first drive electrode block in a period when the detector receives the first detection signal and couple at least two or more of the first electrodes to one another in at least the second direction to form a second drive electrode block in a period when the detector receives the second detection signal.

BRIEF DESCRIPTION OF THE DRAWINGS

FIG. 31 is a diagram of an example of the thresholds in hover detection according to a modification of the first embodiment;

DETAILED DESCRIPTION

Figure 1:
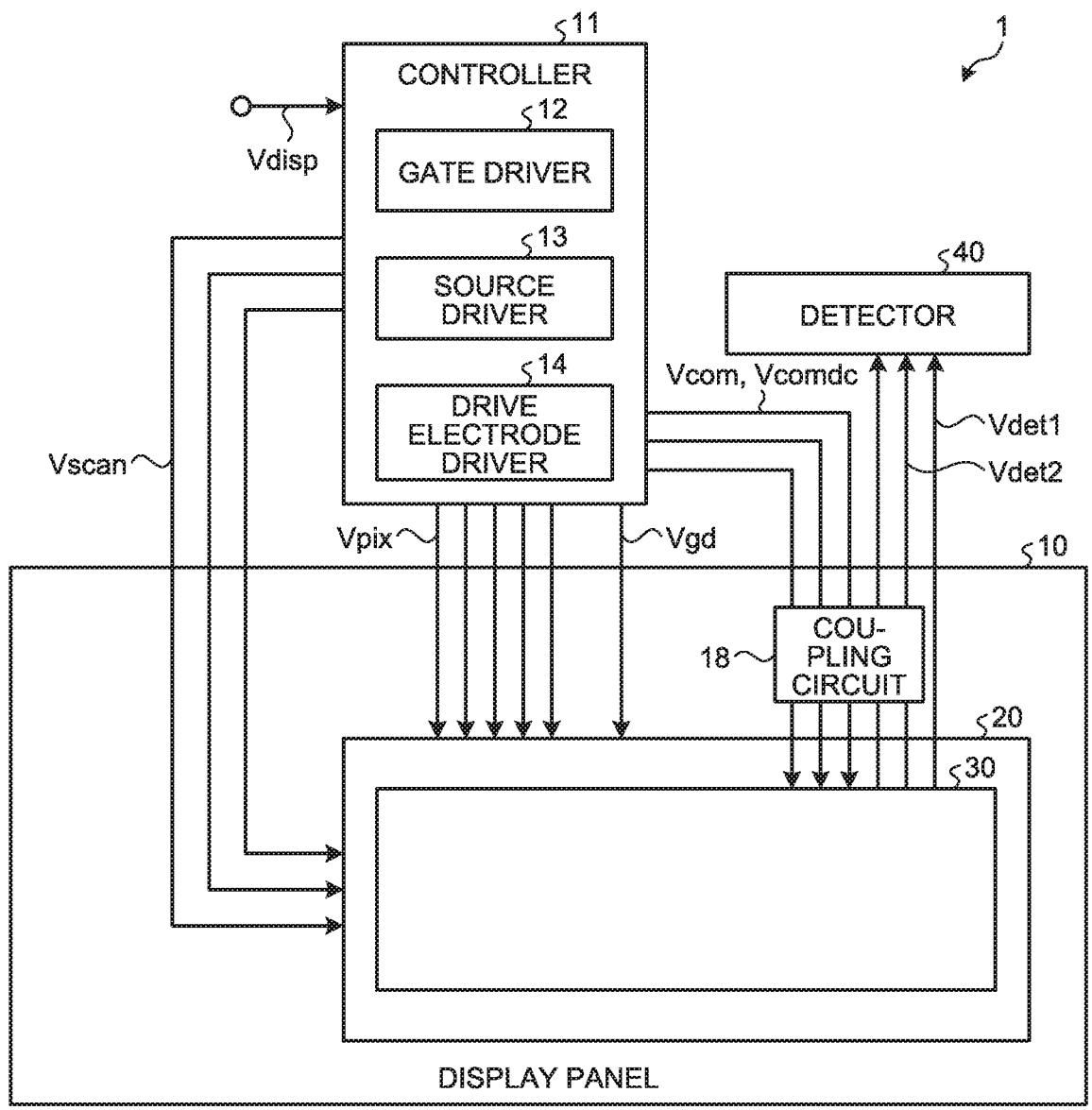
FIG. 1 is a block diagram of an exemplary configuration of a display device according to a first embodiment of the present disclosure.

Exemplary aspects (embodiments) to embody the present disclosure are described below in greater detail with reference to the accompanying drawings. The contents described in the embodiments are not intended to limit the present disclosure. Components described below include components easily conceivable by those skilled in the art and components substantially identical therewith. Furthermore, the components described below may be appropriately combined. What is disclosed herein is given by way of example only, and appropriate changes made without departing from the spirit of the present disclosure and easily conceivable by those skilled in the art naturally fall within the scope of the disclosure. To simplify the explanation, the drawings may possibly illustrate the width, the thickness, the shape, and other elements of each unit more schematically than the actual aspect. These elements, however, are given by way of example only and are not intended to limit interpretation of the present disclosure. In the present specification and the figures, components similar to those previously described with reference to previous figures are denoted by like reference numerals, and detailed explanation thereof may be appropriately omitted.

First Embodiment

Figure 2:
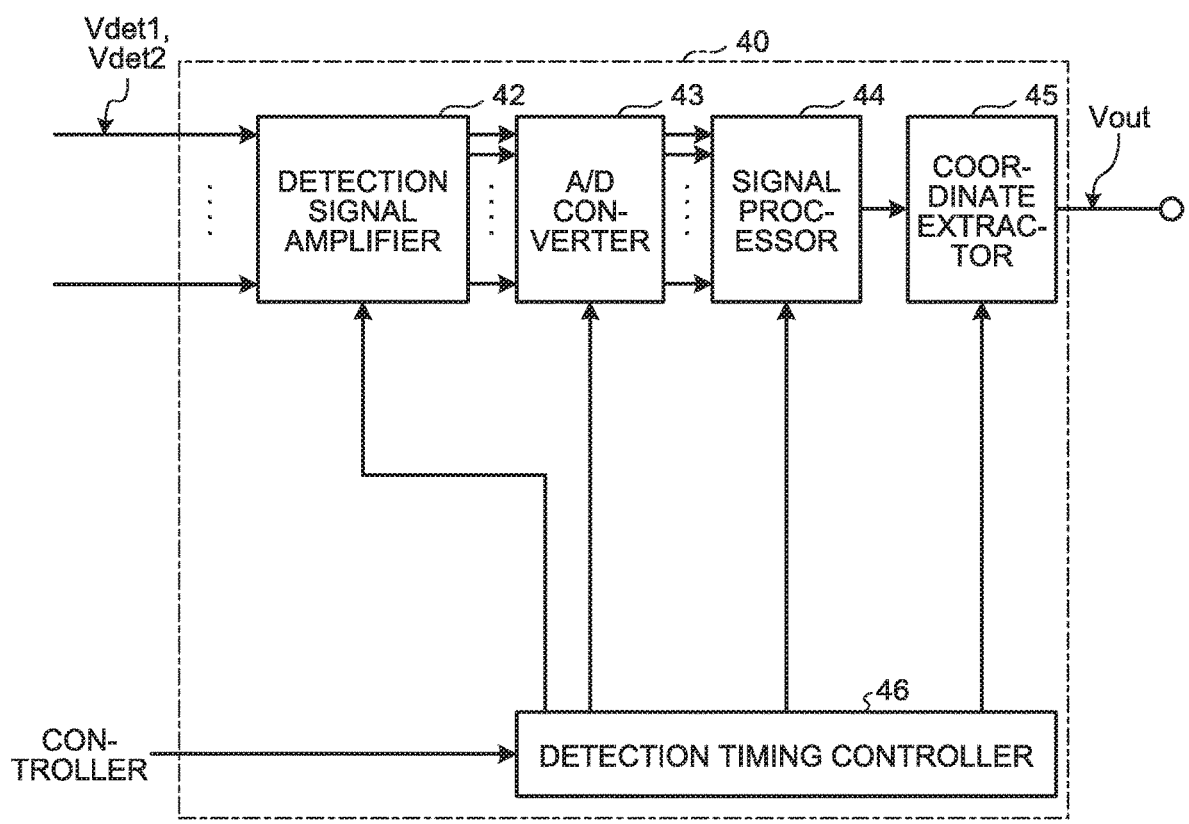
FIG. 2 is a block diagram of an exemplary configuration of a detector.

FIG. 1 is a block diagram of an exemplary configuration of a display device according to a first embodiment of the present disclosure. FIG. 2 is a block diagram of an exemplary configuration of a detector. As illustrated in FIG. 1, a display device 1 includes a display panel 10, a controller 11, and a detector 40. The display panel 10 includes a display portion 20 and a touch sensor 30. The display portion 20 displays an image. The touch sensor 30 is a detection device that detects touch input.

The display panel 10 is a display device in which the display portion 20 and the touch sensor 30 are integrated. Specifically, the display panel 10 is what is called an in-cell or hybrid device in which the capacitance touch sensor 30 is included in and integrated with the display portion 20. Including and integrating the capacitance touch sensor 30 in and with the display portion 20 includes a case where part of members, such as substrates and electrodes, of the display portion 20 are also used as part of members, such as substrates and electrodes, of the touch sensor 30, for example. The display panel 10 may be what is called an on-cell device in which the touch sensor 30 is mounted on the display portion 20. In a case where the display panel 10 is an on-cell device, the touch sensor 30 may be provided on the display portion 20. Alternatively, the touch sensor 30 may be provided not on but above the display portion 20 with another layer interposed therebetween.

While the display portion 20 in the present exemplary configuration is a liquid crystal display device including liquid crystal display elements, it may include organic electroluminescence (EL) elements. In this case, one of anodes and cathodes serving as the organic EL elements may be used as drive electrodes COML, which will be described later.

The display portion 20 includes a plurality of pixels having the display elements and has a display surface facing the pixels. The display portion 20 performs display by sequentially scanning horizontal lines one by one based on scanning signals Vscan supplied from a gate driver 12, which will be described later.

The controller 11 includes the gate driver 12, a source driver 13, and a drive electrode driver 14. The controller 11 supplies control signals to the gate driver 12, a coupling circuit 18, and the detector 40 based on video signals Vdisp supplied from the outside, thereby controlling a display operation and a detection operation.

The gate driver 12 has a function to sequentially select one horizontal line to be a target of display drive in the display panel 10 based on the control signals supplied from the controller 11.

The source driver 13 is a circuit that supplies pixel signals Vpix to respective sub-pixels SPix of the display portion 20. Part of the functions of the source driver 13 may be provided to the display panel 10. In this case, the controller 11 may generate the pixel signals Vpix and supply them to the source driver 13.

The drive electrode driver 14 supplies display drive signals Vcomdc or detection drive signals Vcom to the drive electrodes COML of the display panel 10 via the coupling circuit 18. The drive electrode driver 14 supplies guard signals Vgd to touch detection electrodes TDL and other components in hover detection.

The controller 11 has two detection modes performed by the touch sensor 30, that is, a touch detection mode and a hover detection mode. In the present specification, touch detection is to detect the position of an object to be detected in a state where the object to be detected is in contact with the display surface or in proximity to the display surface close enough to consider it in contact therewith (hereinafter, referred to as a "contact state"). Hover detection is to detect the position and a movement of an object to be detected in a state where the object to be detected is neither in contact with the display surface nor in proximity to the display surface close enough to consider it in contact therewith (hereinafter, referred to as a "non-contact state"). A state where no object to be detected is present at a position facing the display surface or a state where an object to be detected is too far away from the display surface to be detected in hover detection is referred to as a "non-present state".

The touch sensor 30 has a function to detect the position of an object to be detected touching the display surface of the display panel 10 based on the basic principle of mutual capacitance touch detection. If the touch sensor 30 detects a touch of an object to be detected in mutual capacitance touch detection, the touch sensor 30 outputs detection signals Vdet1 to the detector 40. The touch sensor 30 also has a function to detect the position of an object to be detected hovering above the display surface of the display panel 10 based on the basic principle of self-capacitance touch detection. If the touch sensor 30 detects hover of an object to be detected in self-capacitance touch detection, the touch sensor 30 outputs detection signals Vdet2 to the detector 40.

The coupling circuit 18 couples a plurality of drive electrodes COML to one another via respective wires 51 (refer to FIG. 13, which will be described later). With this configuration, drive electrode blocks COMLA, which will be described later, serve as detection electrodes in touch detection, and drive electrode blocks COMLB or COMLC, which will be described later, serve as detection electrodes in hover detection. The detection signals Vdet2 output from the drive electrode blocks COMLB or COMLC are supplied to the detector 40 via the coupling circuit 18.

The detector 40 is a circuit that determines, in mutual capacitance touch detection, whether an object to be detected is touching the display surface of the display panel 10 based on the control signals supplied from the controller 11 and on the detection signals Vdet1 output from the display panel 10. The detector 40 is also a circuit that determines, in self-capacitance hover detection, whether an object to be detected is hovering above the display surface of the display panel 10 based on the control signals supplied from the controller 11 and on the detection signals Vdet2 output from the display panel 10. If a touch is detected, the detector 40 calculates the coordinates at which the touch input is performed, for example. If an object to be detected is detected in hover detection, the detector 40 calculates the coordinates at which the hover input is performed, for example.

As illustrated in FIG. 2, the detector 40 includes a detection signal amplifier 42, an analog/digital (A/D) converter 43, a signal processor 44, a coordinate extractor 45, and a detection timing controller 46. The detection timing controller 46 controls the detection signal amplifier 42, the A/D converter 43, the signal processor 44, and the coordinate extractor 45 such that they operate synchronously with one another based on the control signals supplied from the controller 11.

The detection signal amplifier 42 amplifies the detection signals Vdet1 and Vdet2 supplied from the display panel 10. The A/D converter 43 samples analog signals output from the detection signal amplifier 42 at a timing synchronized with the drive signals Vcom, thereby converting the analog signals into digital signals.

The signal processor 44 is a logic circuit that determines whether an object to be detected is touching or hovering above the display panel 10 based on the output signals from the A/D converter 43. The signal processor 44, for example, performs processing of extracting a signal (absolute value |ΔV|) of the difference between the detection signals caused by a finger. The signal processor 44 compares the absolute value |ΔV| with a predetermined threshold voltage. If the absolute value |ΔV| is lower than the threshold voltage, the signal processor 44 determines that an object to be detected is in the non-contact state. By contrast, if the absolute value |ΔV| is equal to or higher than the threshold voltage, the signal processor 44 determines that an object to be detected is in the contact state. The detector 40 thus can perform touch detection and hover detection.

The coordinate extractor 45 is a logic circuit that calculates, if the signal processor 44 detects an object to be detected in touch detection or hover detection, the touch panel coordinates of the detection position. The coordinate extractor 45 outputs the calculated panel coordinates as output signals Vout. The coordinate extractor 45 may output the output signals Vout to the controller 11. The controller 11 can perform a predetermined display operation or detection operation based on the output signals Vout.

The detection signal amplifier 42, the A/D converter 43, the signal processor 44, the coordinate extractor 45, and the detection timing controller 46 of the detector 40 are provided to the display device 1. The configuration is not limited thereto, and all or part of the functions of the detector 40 may be provided to an external processor, for example. The coordinate extractor 45, for example, may be provided to an external processor different from the display device 1. In this case, the detector 40 may output the signals processed by the signal processor 44 as the output signals Vout.

Figure 3:
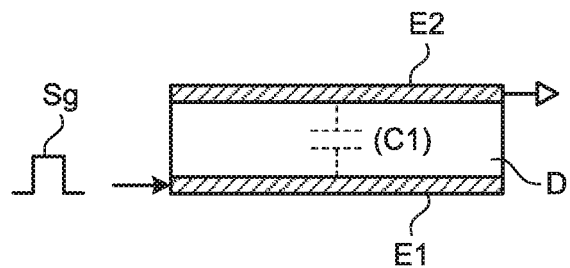
FIG. 3 is a diagram for explaining the basic principle of mutual capacitance touch detection and illustrates a state where a finger is not touching a detection electrode.
Figure 4:
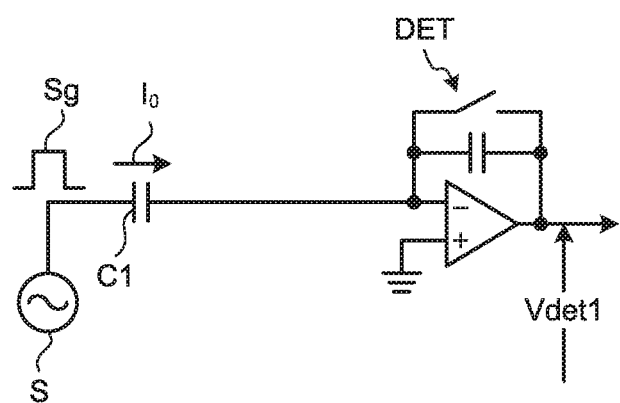
FIG. 4 is a diagram for explaining an example of an equivalent circuit in the state where a finger is not touching the detection electrode illustrated in FIG. 3.
Figure 5:
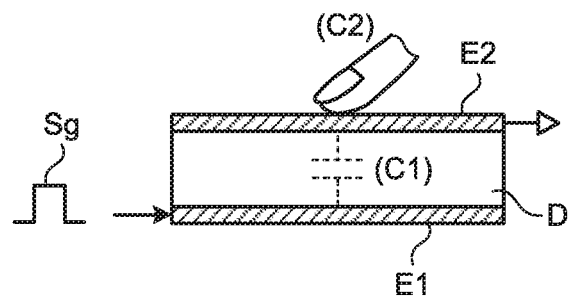
FIG. 5 is a diagram for explaining the basic principle of mutual capacitance touch detection and illustrates a state where a finger is touching the detection electrode.
Figure 6:
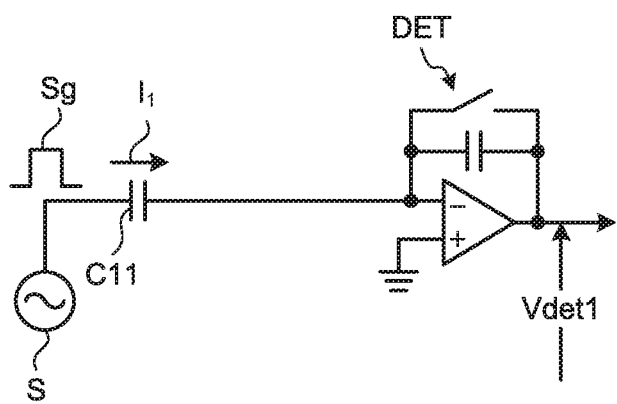
FIG. 6 is a diagram for explaining an example of the equivalent circuit in the state where a finger is touching the detection electrode illustrated in FIG. 5.
Figure 7:
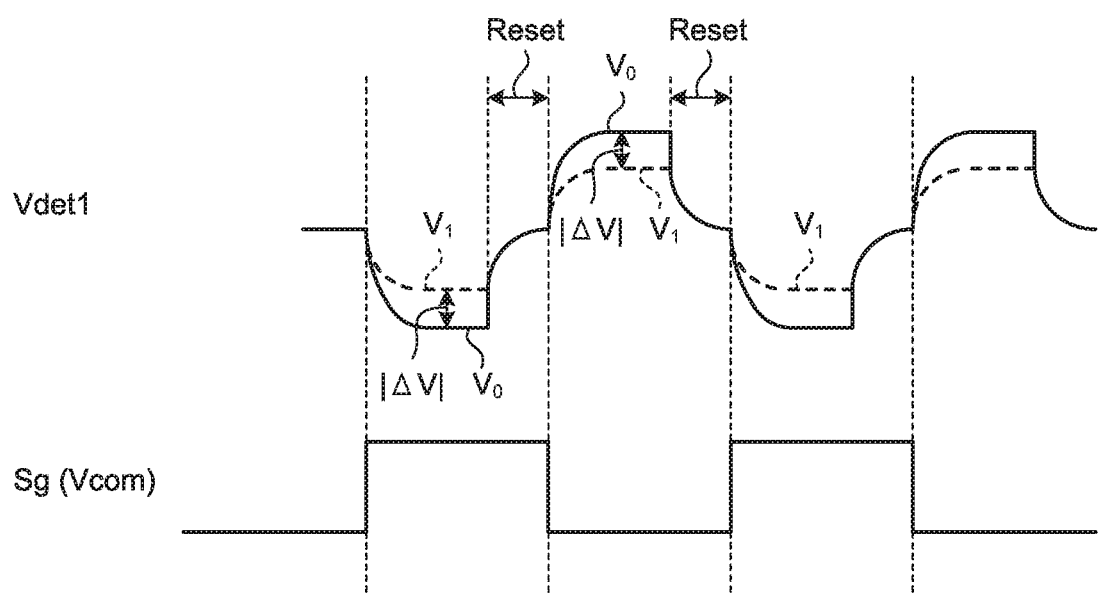
FIG. 7 is a diagram of an example of waveforms of a drive signal and a detection signal in mutual capacitance touch detection.

The display panel 10 performs hover control based on the basic principle of capacitance touch detection. The following describes the basic principle of mutual capacitance touch detection performed by the display device 1 according to the present embodiment with reference to FIGS. 3 to 7. FIG. 3 is a diagram for explaining the basic principle of mutual capacitance touch detection and illustrates a state where a finger is not touching a detection electrode. FIG. 4 is a diagram for explaining an example of an equivalent circuit in the state where a finger is not touching the detection electrode illustrated in FIG. 3. FIG. 5 is a diagram for explaining the basic principle of mutual capacitance touch detection and illustrates a state where a finger is touching the detection electrode. FIG. 6 is a diagram for explaining an example of the equivalent circuit in the state where a finger is touching the detection electrode illustrated in FIG. 5. FIG. 7 is a diagram of an example of waveforms of a drive signal and a detection signal in mutual capacitance touch detection. FIG. 6 also illustrates a detection circuit. While the following describes a case where a finger serving as an object to be detected touches the detection electrode, the object to be detected is not limited to a finger and may be an object including a conductor, such as a stylus.

As illustrated in FIG. 3, a capacitance element C1 includes a pair of electrodes, that is, a drive electrode E1 and a detection electrode E2 facing each other with a dielectric D interposed therebetween. As illustrated in FIG. 4, a first end of the capacitance element C1 is coupled to an alternating-current (AC) signal source (drive signal source) S, and a second end thereof is coupled to a voltage detector DET. The voltage detector DET is an integration circuit included in the detection signal amplifier 42 illustrated in FIG. 2, for example.

When the AC signal source S applies an AC rectangular wave Sg at a predetermined frequency (e.g., a frequency of the order of several kilohertz to several hundred kilohertz) to the drive electrode E1 (first end of the capacitance element C1), an output waveform (detection signal Vdet1) illustrated in FIG. 7 appears via the voltage detector DET coupled to the detection electrode E2 (second end of the capacitance element C1). The AC rectangular wave Sg corresponds to the drive signal Vcom received from the drive electrode driver 14.

If no finger is present at a position facing the display surface or in a state where a finger is too far away from the display surface to be detected in hover detection (non-present state), an electric current $I_0$ depending on the capacitance value of the capacitance element C1 flows in association with charge and discharge of the capacitance element C1 as illustrated in FIGS. 3 and 4. The voltage detector DET illustrated in FIG. 4 converts fluctuations in the electric current $I_0$ depending on the AC rectangular wave Sg into fluctuations in the voltage (waveform $V_0$ indicated by the solid line (refer to FIG. 7)).

By contrast, in a state where a finger is in contact with or in proximity to the display surface (contact state), capacitance C2 formed by the finger is in contact with or in proximity to the detection electrode E2 as illustrated in FIG. 5. Fringe capacitance formed between the drive electrode E1 and the detection electrode E2 are blocked by the finger. As a result, the capacitance element C1 acts as a capacitance element C11 having a capacitance value smaller than that in the non-present state as illustrated in FIG. 6. As indicated by the equivalent circuit in FIG. 6, an electric current L flows through the capacitance element C11.

As illustrated in FIG. 7, the voltage detector DET converts fluctuations in the electric current $I_1$ depending on the AC rectangular wave Sg into fluctuations in the voltage (waveform $V_1$ indicated by the dotted line). In this case, the waveform $V_1$ has amplitude smaller than that of the waveform $V_0$. The absolute value $|\Delta V|$ of the voltage difference between the waveform $V_0$ and the waveform $V_1$ varies depending on an effect of a conductor, such as a finger, in contact with or in proximity to the detection electrode from the outside. To accurately detect the absolute value $|\Delta V|$ of the voltage difference between the waveform $V_0$ and the waveform $V_1$, the voltage detector DET preferably performs operations having a period Reset for resetting charge and discharge of a capacitor based on the frequency of the AC rectangular wave Sg by switching in the circuit.

The touch sensor 30 illustrated in FIG. 1 sequentially scans detection blocks one by one based on the drive signals Vcom supplied from the drive electrode driver 14, thereby performing mutual capacitance touch detection. The touch sensor 30 outputs the detection signals Vdet1 of respective detection blocks from the touch detection electrodes TDL, which will be described later, via the voltage detector DET illustrated in FIG. 4 or 6. The detection signals Vdet1 are supplied to the detection signal amplifier 42 of the detector 40.

Figure 8:
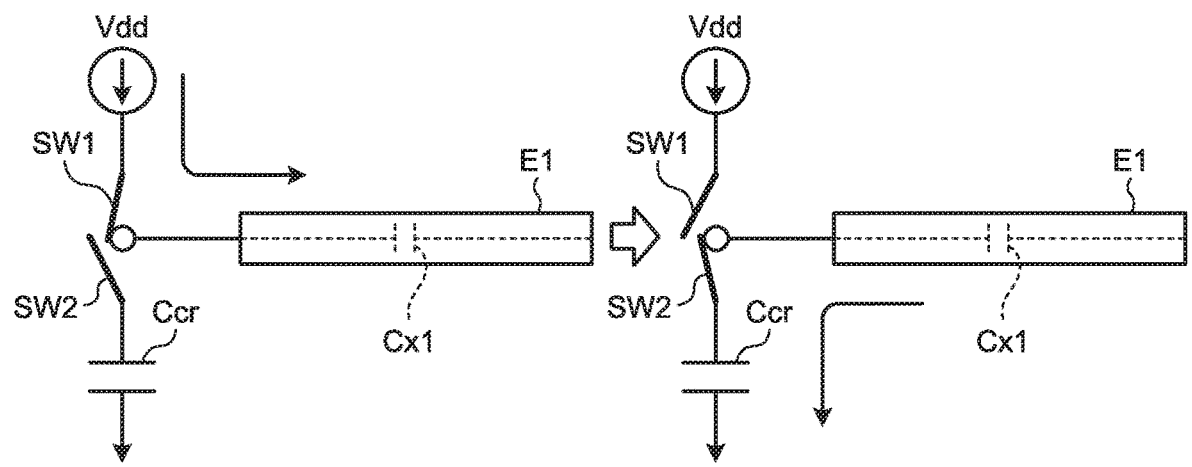
FIG. 8 is a diagram for explaining the basic principle of self-capacitance touch detection and illustrates a state where a finger is not touching the detection electrode.
Figure 9:
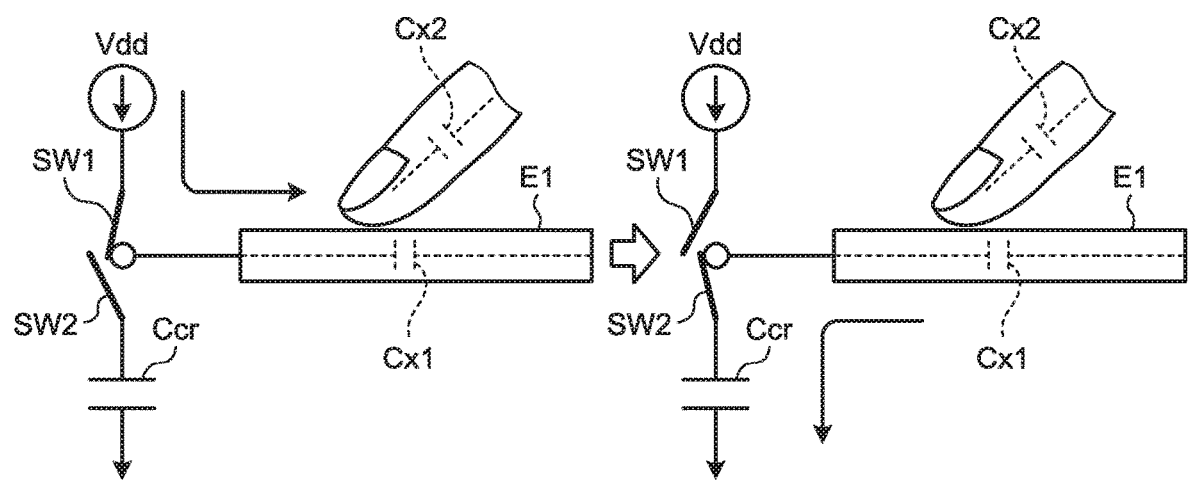
FIG. 9 is a diagram for explaining the basic principle of self-capacitance touch detection and illustrates a state where a finger is touching the detection electrode.
Figure 10:
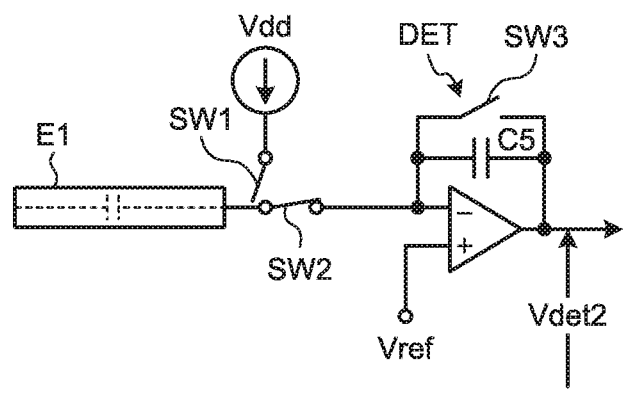
FIG. 10 is a diagram for explaining an example of an equivalent circuit in self-capacitance touch detection.
Figure 11:
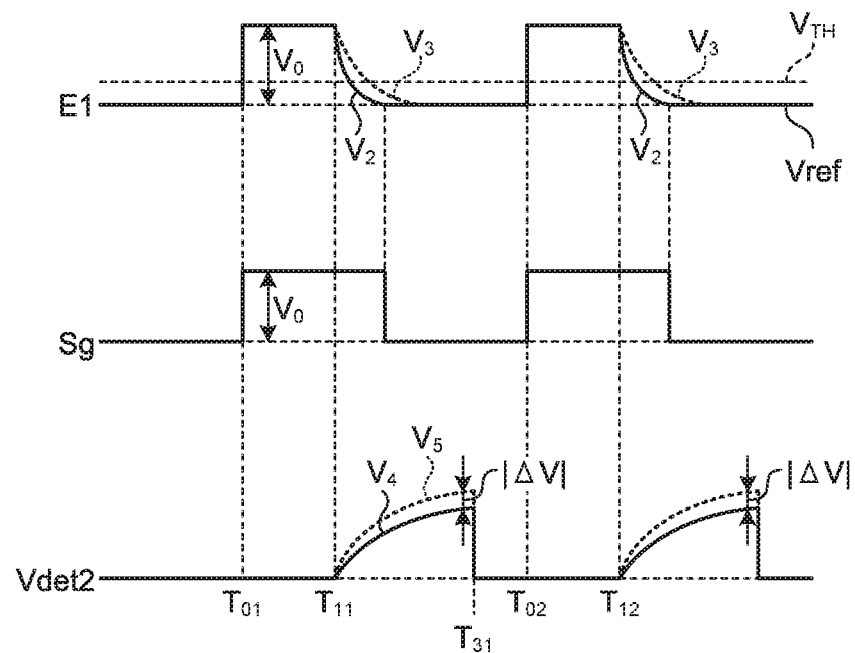
FIG. 11 is a diagram of an example of waveforms of a drive signal and a detection signal in self-capacitance touch detection.

The following describes the basic principle of self-capacitance touch detection with reference to FIGS. 8 to 11. FIG. 8 is a diagram for explaining the basic principle of self-capacitance touch detection and illustrates a state where a finger is not touching the detection electrode. FIG. 9 is a diagram for explaining the basic principle of self-capacitance touch detection and illustrates a state where a finger is touching the detection electrode. FIG. 10 is a diagram for explaining an example of an equivalent circuit in self-capacitance touch detection. FIG. 11 is a diagram of an example of waveforms of a drive signal and a detection signal in self-capacitance touch detection.

In the self-capacitance method, the drive electrode E1 serves as a detection electrode. In the left figure in FIG. 8, the detection electrode E1 is coupled to a power source Vdd by a switching element SW1 but is not coupled to a capacitor Ccr by a switching element SW2 in a state where a finger is not touching the detection electrode. In this state, capacitance Cx1 of the detection electrode E1 is charged. In the right figure in FIG. 8, coupling between the power source Vdd and the detection electrode E1 is cut off by the switching element SW1, and the detection electrode E1 is coupled to the capacitor Ccr by the switching element SW2.

In this state, an electric charge in the capacitance Cx1 is discharged via the capacitor Ccr.

In the left figure in FIG. 9, the detection electrode E1 is coupled to the power source Vdd by the switching element SW1 but is not coupled to the capacitor Ccr by the switching element SW2 in a state where a finger is touching the detection electrode. In this state, capacitance Cx2 generated by the finger in proximity to the detection electrode E1 is also charged besides the capacitance Cx1 of the detection electrode E1. In the right figure in FIG. 9, coupling between the power source Vdd and the detection electrode E1 is cut off by the switching element SW1, and the detection electrode E1 is coupled to the capacitor Ccr by the switching element SW2. In this state, electric charges in the capacitance Cx1 and the capacitance Cx2 are discharged via the capacitor Ccr.

Because of the presence of the capacitance Cx2, the voltage change characteristics of the capacitor Ccr in discharging (the state where a finger is touching the detection electrode) illustrated in the right figure in FIG. 9 are obviously different from those of the capacitor Ccr in discharging (the state where a finger is not touching the detection electrode) illustrated in the right figure in FIG. 8. In the self-capacitance method, it is determined whether an input operation is performed by a finger or the like using the fact that the voltage change characteristics of the capacitor Ccr vary depending on the presence of the capacitance Cx2.

Specifically, an AC rectangular wave Sg (refer to FIG. 11) at a predetermined frequency (e.g., a frequency of the order of several kilohertz to several hundred kilohertz) is applied to the detection electrode E1. The voltage detector DET illustrated in FIG. 10 converts fluctuations in the electric current depending on the AC rectangular wave Sg into fluctuations in the voltage (waveforms $V_4$ and $V_5$).

As described above, the detection electrode E1 can be cut off from the power source Vdd and the capacitor Ccr by the switching elements SW1 and SW2. As illustrated in FIG. 11, the voltage level of the AC rectangular wave Sg rises by an amount corresponding to a voltage $V_0$ at time $T_{01}$. At this time, the switching element SW1 is turned on, and the switching element SW2 is turned off. As a result, the voltage level of the detection electrode E1 also rises by the voltage $V_0$. Subsequently, the switching element SW1 is turned off before time $T_{11}$. While the detection electrode E1 is not electrically coupled to any component at this time, the electric potential of the detection electrode E1 is maintained at $V_0$ by the capacitance Cx1 (refer to FIG. 8) of the detection electrode E1 or capacitance (Cx1+Cx2, refer to FIG. 9) obtained by adding the capacitance Cx2 generated by a touch of a finger or the like to the capacitance Cx1 of the detection electrode E1. Subsequently, a switching element SW3 is turned on before time $T_{11}$ and is turned off after a predetermined time has elapsed, thereby resetting the voltage detector DET. With this reset operation, the output voltage is made substantially equal to a reference voltage Vref.

Subsequently, when the switching element SW2 is turned on at time $T_{11}$, the voltage in an inversion input unit of the voltage detector DET rises to the voltage $V_0$ equal to that of the detection electrode E1. Subsequently, the voltage in the inversion input unit of the voltage detector DET falls to the reference voltage Vref based on a time constant of the capacitance Cx1 (or Cx1+Cx2) of the detection electrode E1 and capacitance C5 in the voltage detector DET. Because the electric charge accumulated in the capacitance Cx1 (or Cx1+Cx2) of the detection electrode E1 moves to the capacitance C5 in the voltage detector DET, output from the voltage detector DET rises (Vdet2). When a finger or the like is not touching the detection electrode E1, the output (Vdet2) from the voltage detector DET is represented by a waveform $V_4$ indicated by the solid line, and Vdet2=Cx1× $V_0$/C5 is satisfied. When capacitance generated by an effect of a finger or the like is added, the output is represented by a waveform $V_5$ indicated by the dotted line, and Vdet2= (Cx1+Cx2)×$V_0$/C5 is satisfied.

Subsequently, at time $T_{31}$ after the electric charge in the capacitance Cx1 (or Cx1+Cx2) of the detection electrode E1 sufficiently moves to the capacitance C5, the switching element SW2 is turned off, and the switching elements SW1 and SW3 are turned on. This operation causes the electric potential of the detection electrode E1 to fall to a low level equal to that of the AC rectangular wave Sg and resets the voltage detector DET. The timing to turn on the switching element SW1 may be any timing as long as it is after the turning off of the switching element SW2 and before time $T_{02}$. The timing to reset the voltage detector DET may be any timing as long as it is after the turning off of the switching element SW2 and before time $T_{12}$. The operation described above is repeatedly performed at a predetermined frequency (e.g., a frequency of the order of several kilohertz to several hundred kilohertz). As a result, it can be determined whether an external proximity object is present (whether a touch is made) based on the absolute value |ΔV| of the difference between the waveform $V_4$ and the waveform $V_5$. As illustrated in FIG. 11, when a finger or the like is not touching the detection electrode, the electric potential of the detection electrode E1 is represented by a waveform $V_2$. By contrast, when the capacitance Cx2 generated by an effect of a finger or the like is added, the electric potential is represented by a waveform $V_3$. It may be determined whether an external proximity object is present (whether a touch is made) by measuring a time until when the waveforms $V_1$ and $V_2$ fall to a predetermined threshold voltage $V_{TH}$.

The touch sensor 30 illustrated in FIG. 1 performs self-capacitance hover detection based on the drive signals Vcom supplied from the drive electrode driver 14. The touch sensor 30 outputs the detection signals Vdet2 from the drive electrode blocks COMLB or COMLC, which will be described later, via the voltage detector DET illustrated in FIG. 10 and supplies them to the detection signal amplifier 42 of the detector 40.

Figure 12:
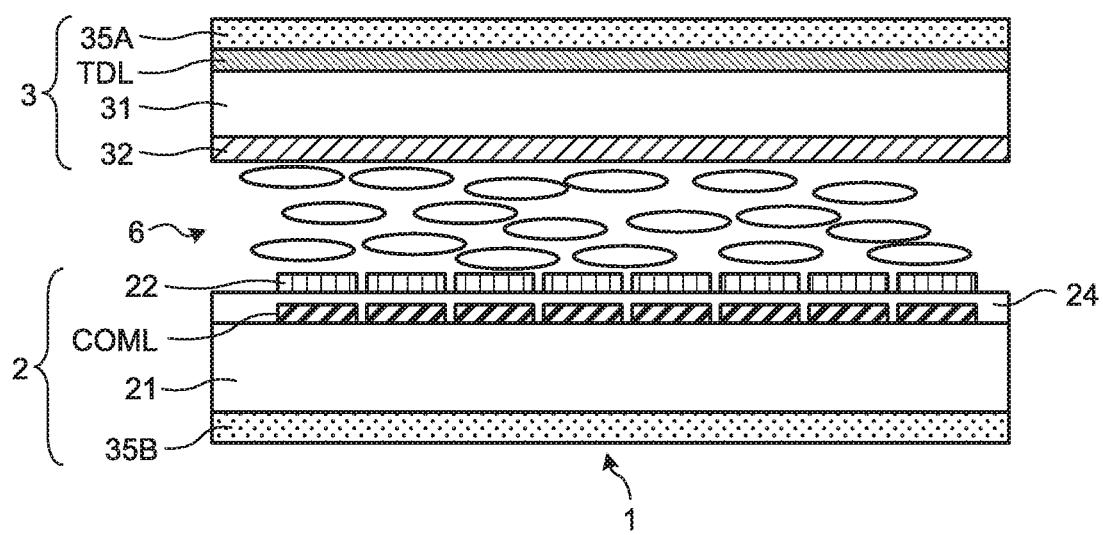
FIG. 12 is a sectional view of a schematic sectional structure of the display device.

The following describes an exemplary configuration of the display device 1 in greater detail. FIG. 12 is a sectional view of a schematic sectional structure of the display device. FIG. 13 is a plan view schematically illustrating a TFT substrate included in the display device. As illustrated in FIG. 12, the display device 1 includes a pixel substrate 2, a counter substrate 3, and a liquid crystal layer 6. The counter substrate 3 is disposed facing the pixel substrate 2 in a direction perpendicular to the surface of the pixel substrate 2. The liquid crystal layer 6 is provided between the pixel substrate 2 and the counter substrate 3.

As illustrated in FIG. 12, the pixel substrate 2 includes a thin-film transistor (TFT) substrate 21, a plurality of pixel electrodes 22, a plurality of drive electrodes COML, and an insulating layer 24. The TFT substrate 21 serves as a circuit board. The pixel electrodes 22 are provided in a row-column configuration (a matrix) on the TFT substrate 21. The drive electrodes COML are provided between the TFT substrate 21 and the pixel electrodes 22. The insulating layer 24 insulates the pixel electrodes 22 from the drive electrodes COML. A polarizing plate 35B is provided under the TFT substrate 21 with an adhesive layer (not illustrated) interposed therebetween. In the present specification, "on" indicates a side in a direction from the TFT substrate 21 toward a counter substrate 31 in the direction perpendicular to the TFT substrate 21, and "under" indicates a side in a direction from the counter substrate 31 toward the TFT substrate 21.

Figure 13:
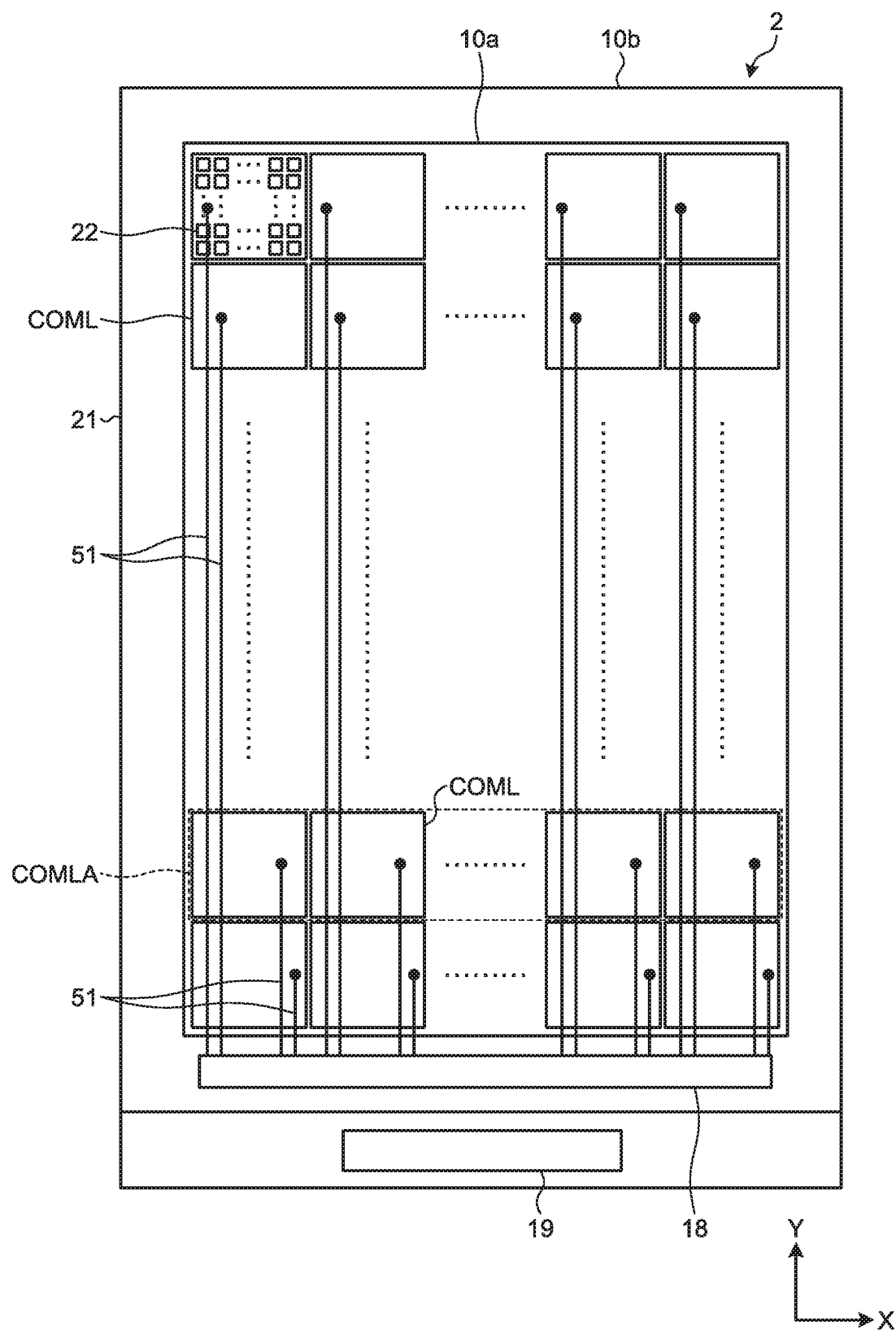
FIG. 13 is a plan view schematically illustrating a TFT substrate included in the display device.

As illustrated in FIG. 13, the TFT substrate 21 has a display region 10a and a frame region 10b. The display region 10a is a region on which an image is displayed. The frame region 10b is provided around the display region 10a. The display region 10a has a rectangular shape having a pair of long sides and short sides. The frame region 10b has a frame shape surrounding the four sides of the display region 10a.

The drive electrodes COML are provided in the display region 10a of the TFT substrate 21 and arrayed in a row-column configuration (a matrix) in directions along the long side and the short side of the display region 10a. The drive electrode COML has a rectangular or square shape in planar view. The drive electrodes COML are made of a translucent conductive material, such as indium tin oxide (ITO). A plurality of pixel electrodes 22 are disposed in a row-column configuration (a matrix) at a position corresponding to one drive electrode COML. The pixel electrode 22 has an area smaller than that of the drive electrode COML. While part of the drive electrodes COML and the pixel electrodes 22 are illustrated in FIG. 13, the drive electrodes COML and the pixel electrodes 22 are disposed across the whole area of the display region 10a. In the display operation or mutual-capacitance touch detection according to the present embodiment, a plurality of drive electrodes COML arrayed in the row direction are coupled to one another by the coupling circuit 18 to serve as a line-shaped drive electrode block COMLA. In the present specification, the row direction is also referred to as an X-direction, and the column direction is also referred to as a Y-direction.

The frame region 10b of the TFT substrate 21 is provided with a display integrated circuit (IC) 19. The display IC 19 is a chip mounted on the TFT substrate 21 by the chip-on-glass (COG) technology. The display IC 19 includes the controller 11 (refer to FIG. 1), for example. The display IC 19 outputs control signals to gate lines GCL, data lines SGL, and other lines, which will be described later, based on the video signals Vdisp (refer to FIG. 1) supplied from an external host IC (not illustrated).

A flexible substrate 41 (refer to FIG. 22), which will be described later, is coupled to the frame region 10b of the TFT substrate 21 and coupled to the display IC 19. The wires 51 are coupled to the respective drive electrodes COML disposed in the display region 10a and extend to the frame region 10b. The drive electrode driver 14 (refer to FIG. 1) included in the display IC 19, for example, is coupled to the drive electrodes COML via the coupling circuit 18 disposed in the frame region 10b and the respective wires 51.

As illustrated in FIG. 13, the display IC 19 may be disposed on the short side of the frame region 10b, for example With this configuration, the display IC 19 need not be provided on the long side of the frame region 10b, thereby reducing the width of the long side of the frame region 10b. While the wires 51 are disposed on the drive electrodes COML with an insulating film (not illustrated) interposed therebetween in FIG. 13, the present embodiment is not limited thereto. The wires 51 according to the present embodiment may be disposed under the drive electrodes COML with an insulating film interposed therebetween.

As illustrated in FIG. 12, the counter substrate 3 includes the counter substrate 31 and a color filter 32. The color filter 32 is provided on one surface of the counter substrate 31. The touch detection electrodes TDL of the touch sensor 30 are provided on the other surface of the counter substrate 31. A polarizing plate 35A is provided on the touch detection electrodes TDL with an adhesive layer (not illustrated) interposed therebetween. A flexible substrate, which is not illustrated, is coupled to the counter substrate 31. The flexible substrate is coupled to the touch detection electrodes TDL via frame wiring.

As illustrated in FIG. 12, the TFT substrate 21 and the counter substrate 31 are disposed facing each other with a predetermined gap interposed therebetween. The liquid crystal layer 6 serving as a display functional layer is provided to the space between the TFT substrate 21 and the counter substrate 31. The liquid crystal layer 6 modulates light passing therethrough depending on the state of an electric field. The liquid crystal layer 6, for example, includes liquid crystals in a lateral electric-field mode, such as the in-plane switching (IPS) mode including the fringe field switching (FFS) mode. Orientation films may be provided between the liquid crystal layer 6 and the pixel substrate 2 and between the liquid crystal layer 6 and the counter substrate 3 illustrated in FIG. 12.

Figure 14:
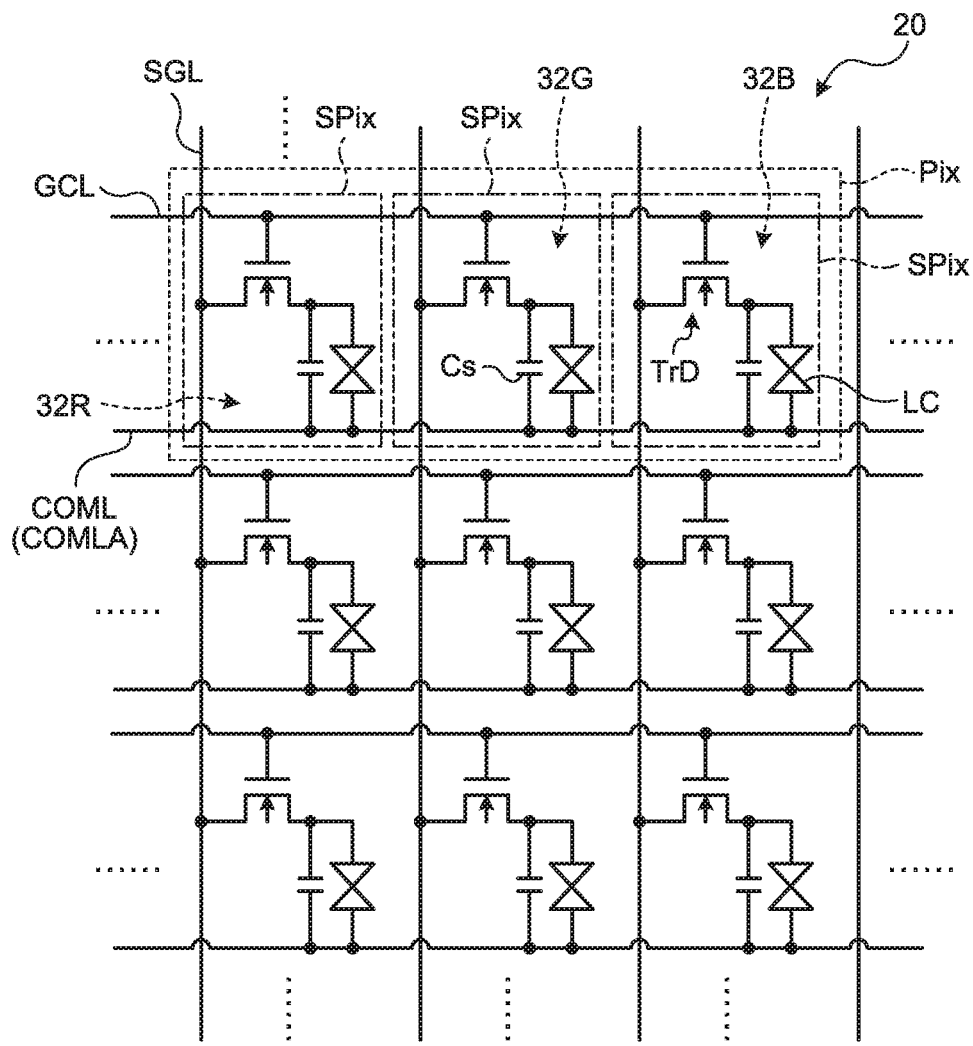
FIG. 14 is a circuit diagram of a pixel array in a display portion according to the first embodiment.
Figure 15:
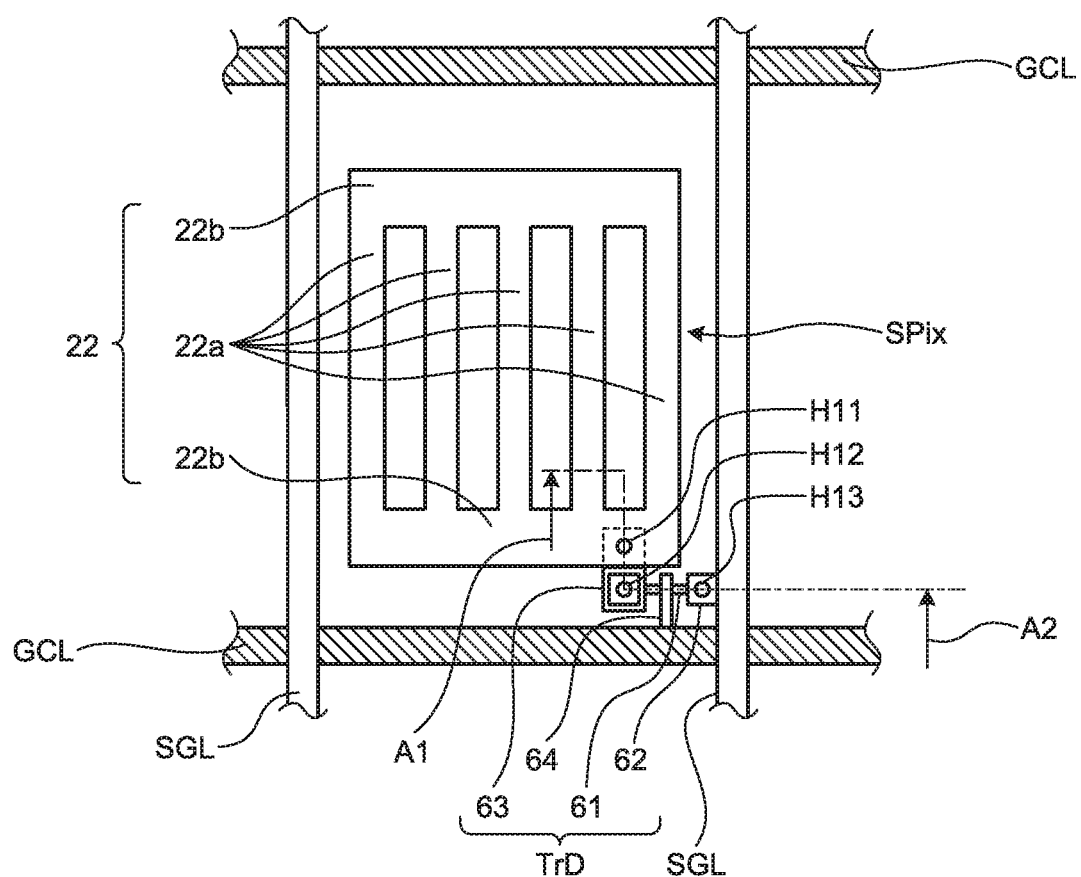
FIG. 15 is a plan view of an exemplary configuration of a sub-pixel.
Figure 16:
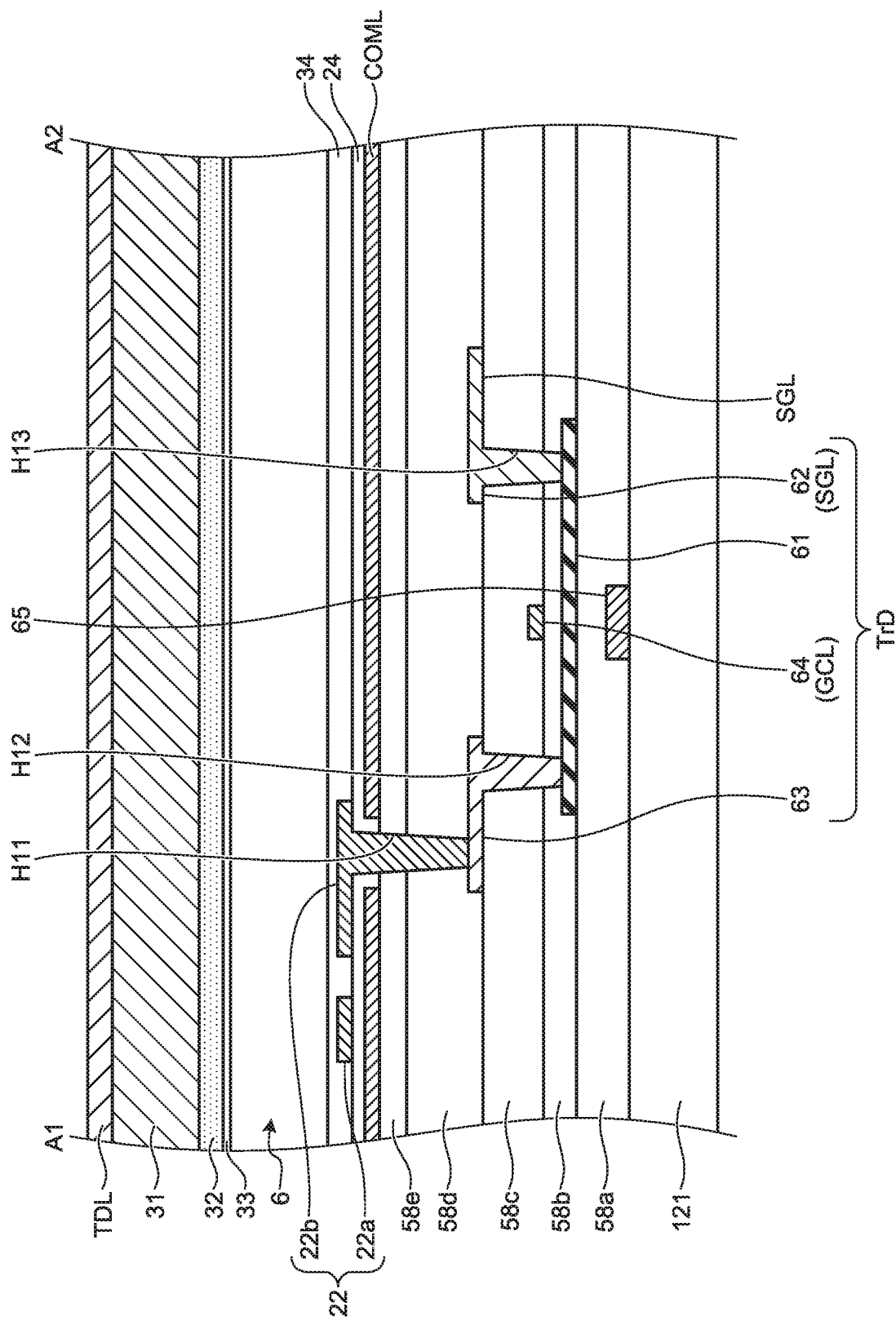
FIG. 16 is a sectional view along line A1-A2 in FIG. 15.

FIG. 14 is a circuit diagram of a pixel array in the display portion according to the first embodiment. FIG. 15 is a plan view of an exemplary configuration of a sub-pixel. FIG. 16 is a sectional view along line A1-A2 in FIG. 15. The TFT substrate 21 illustrated in FIG. 12 is provided with switching elements TrD of respective sub-pixels SPix and wiring, such as the data lines SGL and the gate lines GCL, as illustrated in FIG. 14. The data lines SGL supply the pixel signals Vpix to the respective pixel electrodes 22, and the gate lines GCL supply drive signals for driving the switching elements TrD. The data lines SGL and the gate lines GCL extend on a plane parallel to the surface of the TFT substrate 21.

The display portion 20 illustrated in FIG. 14 includes a plurality of sub-pixels SPix arrayed in a row-column configuration (a matrix). The sub-pixels SPix each include the switching element TrD and a liquid crystal element LC. The switching element TrD is a thin-film transistor and is an n-channel metal oxide semiconductor (MOS) TFT in this example. The source of the switching element TrD is coupled to the data line SGL, the gate thereof is coupled to the gate line GCL, and the drain thereof is coupled to one end of the liquid crystal element LC. The other end of the liquid crystal element LC is coupled to the drive electrode COML included in the drive electrode block COMLA. The insulating layer 24 (refer to FIG. 11) is provided between the pixel electrodes 22 and the drive electrodes COML to form holding capacitance Cs illustrated in FIG. 14.

The sub-pixel SPix is coupled to the other sub-pixels SPix belonging to the same row in the display portion 20 by the gate line GCL. The gate lines GCL are coupled to the gate driver 12 (refer to FIG. 1) and supplied with the scanning signals Vscan from the gate driver 12. The sub-pixel SPix is coupled to the other sub-pixels SPix belonging to the same column in the display portion 20 by the data line SGL. The data lines SGL are coupled to the source driver 13 (refer to FIG. 1) and supplied with the pixel signals Vpix from the source driver 13. The drive electrodes COML included in the drive electrode block COMLA are coupled to the drive electrode driver 14 (refer to FIG. 1) and supplied with the drive signals Vcom from the drive electrode driver 14.

As illustrated in FIG. 15, the area surrounded by the gate lines GCL and the data lines SGL corresponds to one sub-pixel SPix. The sub-pixel SPix includes an area in which the pixel electrode 22 overlaps the drive electrode COML.

A plurality of pixel electrodes 22 are coupled to the data line SGL via the respective switching elements TrD.

As illustrated in FIG. 15, the pixel electrode 22 includes a plurality of strip electrodes 22a and connections 22b. The strip electrodes 22a extend along the data lines SGL and are arrayed in a direction along the gate lines GCL. The connections 22b each connect the ends of the strip electrodes 22a. While the pixel electrode 22 includes five strip electrodes 22a, the structure is not limited thereto. The pixel electrode 22 may include four or less or six or more strip electrodes 22a. The pixel electrode 22 may include two strip electrodes 22a, for example.

As illustrated in FIG. 15, the switching element TrD includes a semiconductor layer 61, a source electrode 62, a drain electrode 63, and a gate electrode 64. A light-shielding layer 65 is provided under the semiconductor layer 61.

As illustrated in FIG. 16, the light-shielding layer 65 is provided on a substrate 121. An insulating layer 58a is provided covering the light-shielding layer 65 on the first substrate 121. The semiconductor layer 61 is provided on the insulating layer 58a. The gate electrode 64 (gate line GCL) is provided above the semiconductor layer 61 with an insulating layer 58b interposed therebetween. The drain electrode 63 and the source electrode 62 (data line SGL) are provided above the gate electrode 64 (gate line GCL) with an insulating layer 58c interposed therebetween. The wire 51 (refer to FIG. 13) is provided above the drain electrode 63 and the source electrode 62 (data line SGL) with an insulating layer 58d interposed therebetween. The drive electrode COML is provided on the wire 51 with an insulating layer 58e interposed therebetween. As described above, the pixel electrode 22 is provided above the drive electrode COML with the insulating layer 24 interposed therebetween. An orientation film 34 is provided on the pixel electrode 22. An orientation film 33 faces the orientation film 34 with the liquid crystal layer 6 interposed therebetween.

As illustrated in FIGS. 15 and 16, the pixel electrode 22 is coupled to the drain electrode 63 of the switching element TrD through a contact hole H11. The semiconductor layer 61 is coupled to the drain electrode 63 through a contact hole H12. The semiconductor layer 61 intersects the gate electrode 64 in planar view. The gate electrode 64 is coupled to the gate line GCL and protrudes from one side of the gate line GCL. The semiconductor layer 61 extends to a position under the source electrode 62 and is electrically coupled to the source electrode 62 through a contact hole H13. The source electrode 62 is coupled to the data line SGL and protrudes from one side of the data line SGL. The wire 51 is provided to a layer different from that of the data line SGL and the gate line GCL and is not electrically coupled to the switching element TrD.

The semiconductor layer 61 may be made of a publicly known material, such as polysilicon and an oxide semiconductor. The use of a transparent amorphous oxide semiconductor (TAOS), for example, can increase the ability (retention) to retain a voltage for video display for a long time and improve the display quality.

The semiconductor layer 61 is provided with a channel (not illustrated) at a portion under the gate electrode 64. The light-shielding layer 65 is preferably provided at a position under the channel and has an area larger than that of the channel. The light-shielding layer 65 blocks light output from a backlight and entering into the semiconductor layer 61, for example.

The gate driver 12 illustrated in FIG. 1 drives to sequentially scan the gate line GCL. The gate driver 12 applies the scanning signals Vscan (refer to FIG. 1) to the gates of the switching elements TrD of the respective sub-pixels SPix via the gate line GCL. The gate driver 12 thus sequentially selects one row (one horizontal line) out of the sub-pixels SPix as a target of display drive. The source driver 13 supplies the pixel signals Vpix to the sub-pixels SPix belonging to the horizontal line selected by the gate driver 12 via the data lines SGL illustrated in FIG. 14. The sub-pixels SPix perform display in units of one horizontal line based on the supplied pixel signals Vpix. To perform the display operation, the drive electrode driver 14 applies the display drive signals Vcomdc to the drive electrodes COML. As a result, the drive electrodes COML serve as common electrodes for the pixel electrodes 22 in display.

The color filter 32 illustrated in FIG. 12 includes periodically arrayed color areas in three colors of red (R), green (G), and blue (B), for example. The color areas 32R, 32G, and 32B in the three colors of R, G, and B, respectively, serve as a set and correspond to the respective sub-pixels SPix illustrated in FIG. 14. A set of the sub-pixels SPix corresponding to the respective color areas 32R, 32G, and 32B in the three colors serves as one pixel Pix. As illustrated in FIG. 12, the color filter 32 faces the liquid crystal layer 6 in the direction perpendicular to the TFT substrate 21. The color filter 32 may have a combination of other colors as long as they are colored in respective different colors. The color filter 32 is not limited to a combination of three colors and may be a combination of four or more colors.

As illustrated in FIG. 14, the drive electrode block COMLA including a plurality of drive electrodes COML according to the present embodiment extend in a direction parallel to the extending direction of the gate lines GCL, that is, in a direction intersecting the extending direction of the data lines SGL. The drive electrode block COMLA does not necessarily have the configuration described above and may extend in a direction parallel to the data lines SGL, for example.

The drive electrodes COML illustrated in FIGS. 12 and 13 serve as common electrodes that supply a common potential (reference potential) to a plurality of pixel electrodes 22 in the display portion 20. The drive electrodes COML also serve as drive electrodes when the touch sensor 30 performs mutual capacitance touch detection. The drive electrodes COML also serve as detection electrodes when the touch sensor 30 performs self-capacitance hover detection.

Figure 17:
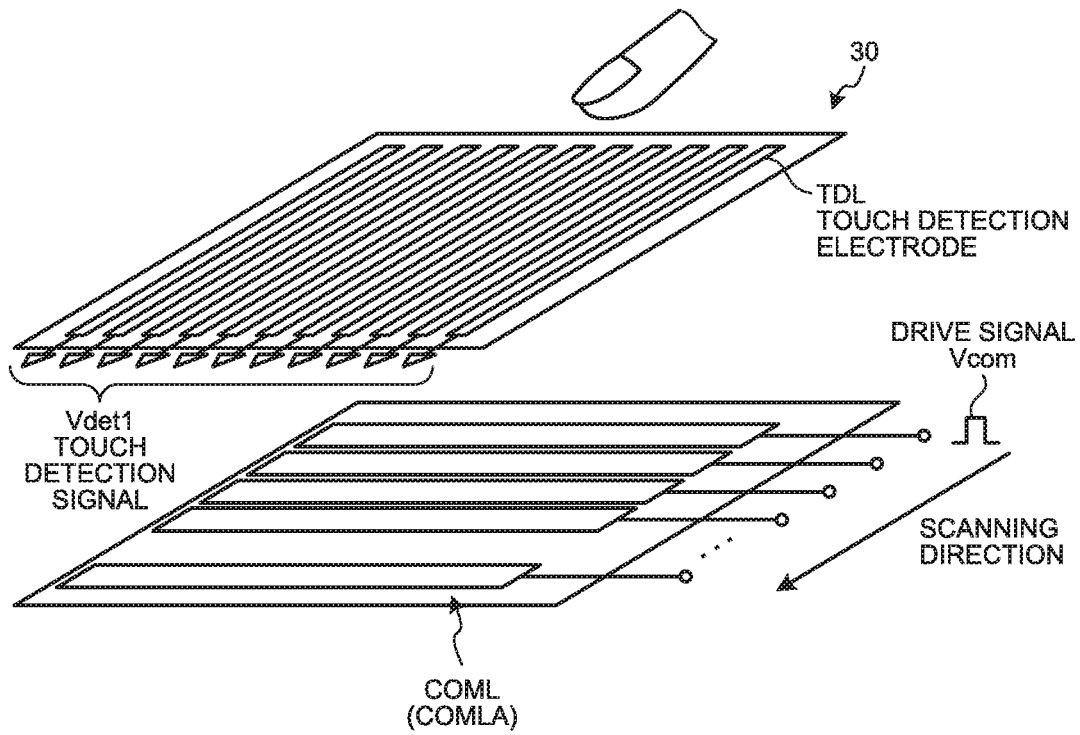
FIG. 17 is a perspective view of an exemplary configuration of drive electrodes and touch detection electrodes in a display panel according to the first embodiment.

FIG. 17 is a perspective view of an exemplary configuration of the drive electrodes and the touch detection electrodes in the display panel according to the first embodiment. The touch sensor 30 includes the drive electrodes COML in the pixel substrate 2 and the touch detection electrodes TDL in the counter substrate 3. The drive electrode blocks COMLA each including a plurality of drive electrodes COML serve as a plurality of stripe electrode patterns extending in the horizontal direction in FIG. 17. The touch detection electrodes TDL include a plurality of electrode patterns extending in a direction intersecting the extending direction of the drive electrode blocks COMLA. The touch detection electrodes TDL face the drive electrode blocks COMLA in the direction perpendicular to the surface of the TFT substrate 21 (refer to FIG. 7). The electrode patterns of the touch detection electrodes TDL are coupled to respective input terminals of the detection signal amplifier 42 of the detector 40 (refer to FIG. 2). Capacitance is formed at the intersections of the electrode patterns of the drive electrodes COML in the drive electrode blocks COMLA and those of the touch detection electrodes TDL.

The touch detection electrodes TDL and the drive electrode blocks COMLA do not necessarily have a shape divided into a plurality of stripe patterns. The touch detection electrodes TDL may have a comb shape, for example. The touch detection electrodes TDL simply need to have a shape divided into a plurality of pieces. The shape of slits that divide the drive electrodes COML may be a straight line or a curved line.

When the touch sensor 30 performs mutual capacitance touch detection, the drive electrode driver 14 drives to sequentially scan each drive electrode block COMLA in a time-division manner. The drive electrode driver 14 thus sequentially selects the drive electrodes COML in the drive electrode block COMLA. The touch detection electrodes TDL output the detection signals Vdet1, whereby touch detection is performed on the drive electrode block COMLA. In other words, the drive electrode blocks COMLA correspond to the drive electrode E1 in the basic principle of mutual capacitance touch detection, and the touch detection electrodes TDL correspond to the detection electrode E2. The touch sensor 30 performs touch detection based on the basic principle. As illustrated in FIG. 17, the touch detection electrodes TDL and the drive electrode blocks COMLA intersecting each other serve as a touch detection surface in a row-column configuration (a matrix). The touch sensor 30 performs scanning across the whole touch detection surface having a row-column configuration (a matrix), thereby detecting a position where an external conductor is in contact with or in proximity to the touch detection surface.

In an example of an operating method performed by the display device 1, the display device 1 performs a detection operation (detection operation period) and a display operation (display operation period) in a time-division manner. The display device 1 may perform the detection operation and the display operation in any division manner. In the following description, the display device 1 performs the detection operation and the display operation by dividing them into a plurality of sections in one frame period (1F) of the display portion 20, that is, in a time required to display video information of one screen.

Figure 18:
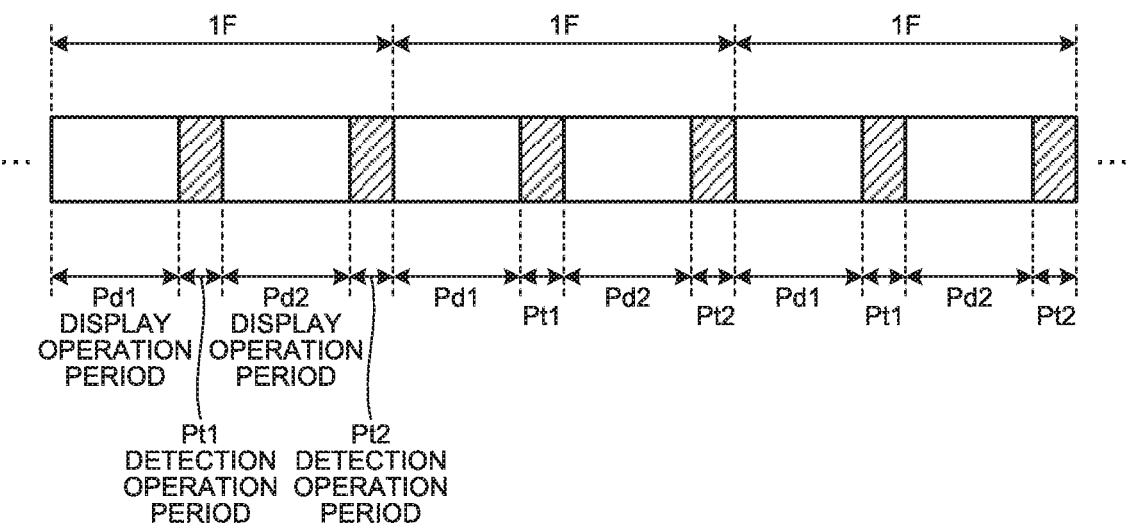
FIG. 18 is a diagram schematically illustrating an example of arrangement of display operation periods and detection operation periods in one frame period.

FIG. 18 is a diagram schematically illustrating an example of arrangement of the display operation periods and the detection operation periods in one frame period. One frame period (1F) includes two display operation periods Pd1 and Pd2 and two detection operation periods Pt1 and Pt2. These periods are alternately arranged on the time axis in the order of the display operation period Pd1, the detection operation period Pt1, the display operation period Pd2, and the detection operation period Pt2, for example.

The controller 11 (refer to FIG. 1) causes the gate driver 12 and the source driver 13 to supply the pixel signals Vpix to the pixels Pix (refer to FIG. 14) in a plurality of rows selected in the display operation periods Pd1 and Pd2. The drive electrodes COML according to the present embodiment also serve as common electrodes of the display portion 20. In the display operation periods Pd1 and Pd2, the controller 11 causes the drive electrode driver 14 to supply the display drive signals Vcomdc serving as a common electrode potential for display to the selected drive electrodes COML.

The detection operation periods Pt1 and Pt2 each have a touch detection period and a hover detection period. The touch detection period is a period for performing touch detection based on changes in mutual capacitance between the touch detection electrodes TDL and the drive electrodes COML. The hover detection period is a period for performing hover detection based on changes in self-capacitance in the drive electrodes COML. In the touch detection period, the controller 11 (refer to FIG. 1) causes the drive electrode driver 14 to supply the detection drive signals Vcom to the drive electrodes COML (drive electrode blocks COMLA) (refer to FIG. 17) selected in the touch detection period. The detector 40 determines whether a touch is made and calculates the coordinates of a touch input position based on the detection signals Vdet1 supplied from the touch detection electrodes TDL.

In the hover detection period, the controller 11 causes the drive electrode driver 14 to supply the detection drive signals Vcom to the drive electrodes COML. The detector 40 determines whether hover is performed and calculates the coordinates of a hover input position based on the detection signals Vdet2 supplied from the drive electrodes COML.

In the example illustrated in FIG. 18, the display device 1 performs video display of one screen by dividing it into two sections in one frame period (1F). The display device 1 may divide the display operation period in one frame period (1F) into a larger number of sections. The display device 1 may divide the detection operation period in one frame period (1F) into a larger number of sections.

The display device 1 may perform touch detection on half of one screen or one screen in each of the detection operation periods Pt1 and Pt2. Alternatively, the display device 1 may perform thinned-out detection or the like as necessary in the detection operation periods Pt1 and Pt2. Still alternatively, the display device 1 may perform the display operation and touch detection once without dividing them into a plurality of sections in one frame period (1F).

In the detection operation periods Pt1 and Pt2, the display device 1 may bring the gate lines GCL and the data lines SGL (refer to FIG. 14) into a state of being supplied with no voltage signal and not being electrically coupled to any component (high impedance). The gate lines GCL and the data lines SGL may be supplied with the guard signals Vgd having the same waveform as that of the detection drive signals Vcom and synchronized with the drive signals Vcom, which will be described later. This mechanism can prevent generation of capacitance between the drive electrodes COML supplied with the detection drive signals Vcom and the gate lines GCL and the data lines SGL. Consequently, the display device 1 can increase the sensitivity in hover detection.

Figure 19:
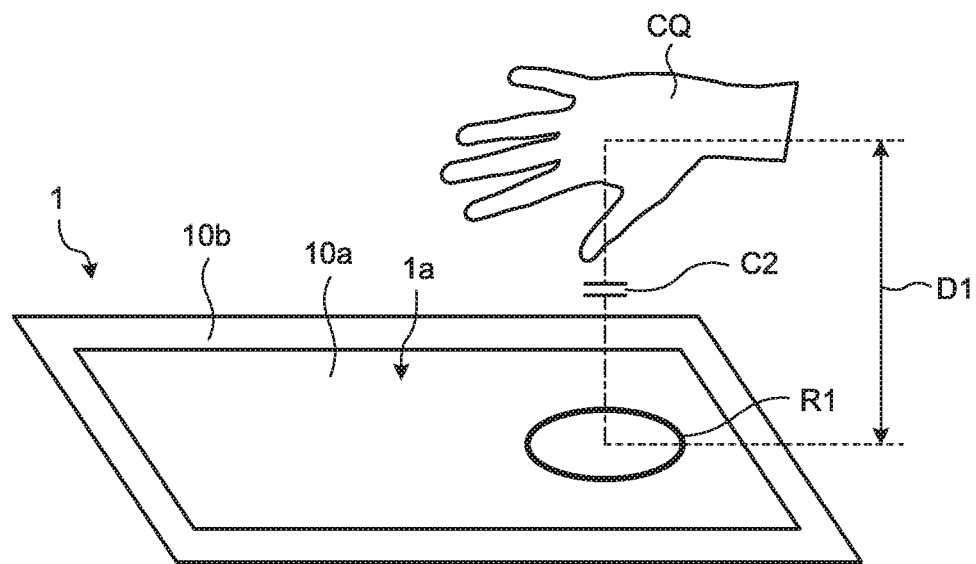
FIG. 19 is a diagram schematically illustrating an example of hover detected by the display device.
Figure 20:
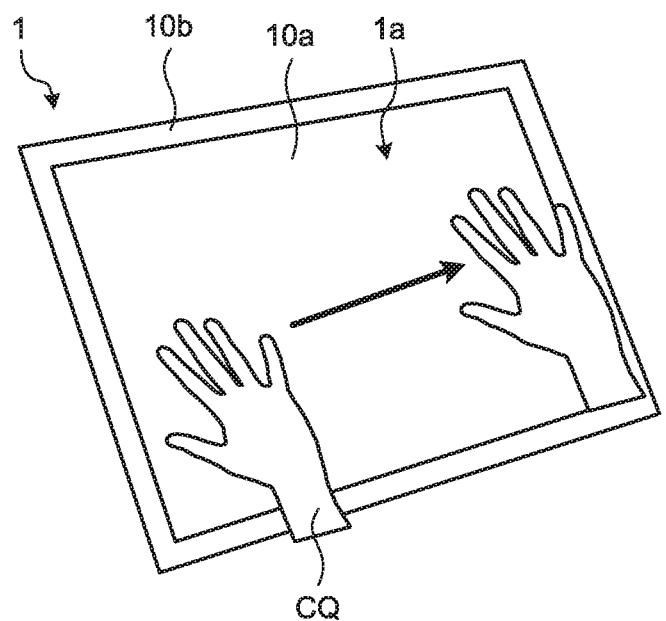
FIG. 20 is a diagram schematically illustrating another example of hover detected by the display device.

FIGS. 19 and 20 are diagrams schematically illustrating an example of hover detected by the display device. FIGS. 19 and 20 illustrate a hand of a user as an object to be detected CQ. In the hover detection period in the detection operation periods Pt1 and Pt2, the display device 1 can detect the position and the height of the object to be detected CQ positioned above a display surface 1a. In FIGS. 19 and 20, the object to be detected CQ is in the non-present state or the non-contact state with respect to the display surface 1a of the display device 1. The object to be detected CQ is apart from the display surface 1a by a distance (height) D1. Capacitance C2 is formed between the drive electrodes COML (not illustrated) disposed on the display surface 1a side and the object to be detected CQ. The detector 40 (refer to FIG. 1) supplies the detection drive signals Vcom to the drive electrodes COML that form the capacitance C2. The detector 40 determines whether the object to be detected CQ is present based on the detection signals Vdet2 output from the drive electrodes COML.

In the non-contact state, the capacitance C2 increases as the distance D1 between the object to be detected CQ and the display surface 1a decreases. The absolute value |ΔV| of the difference between the detection signals Vdet2 increases as the capacitance C2 increases. Consequently, the detector 40 can determine the distance D1 based on the absolute value |ΔV|. The detector 40 specifies the drive electrodes COML having an absolute value |ΔV| of equal to or larger than a predetermined threshold, thereby determining a position R1 at which the object to be detected CQ faces the display surface 1a. Consequently, as illustrated in FIG. 20, the display device 1 can detect a swipe of moving the hand along the display surface 1a and a gesture made by the hand, for example.

Figure 21:
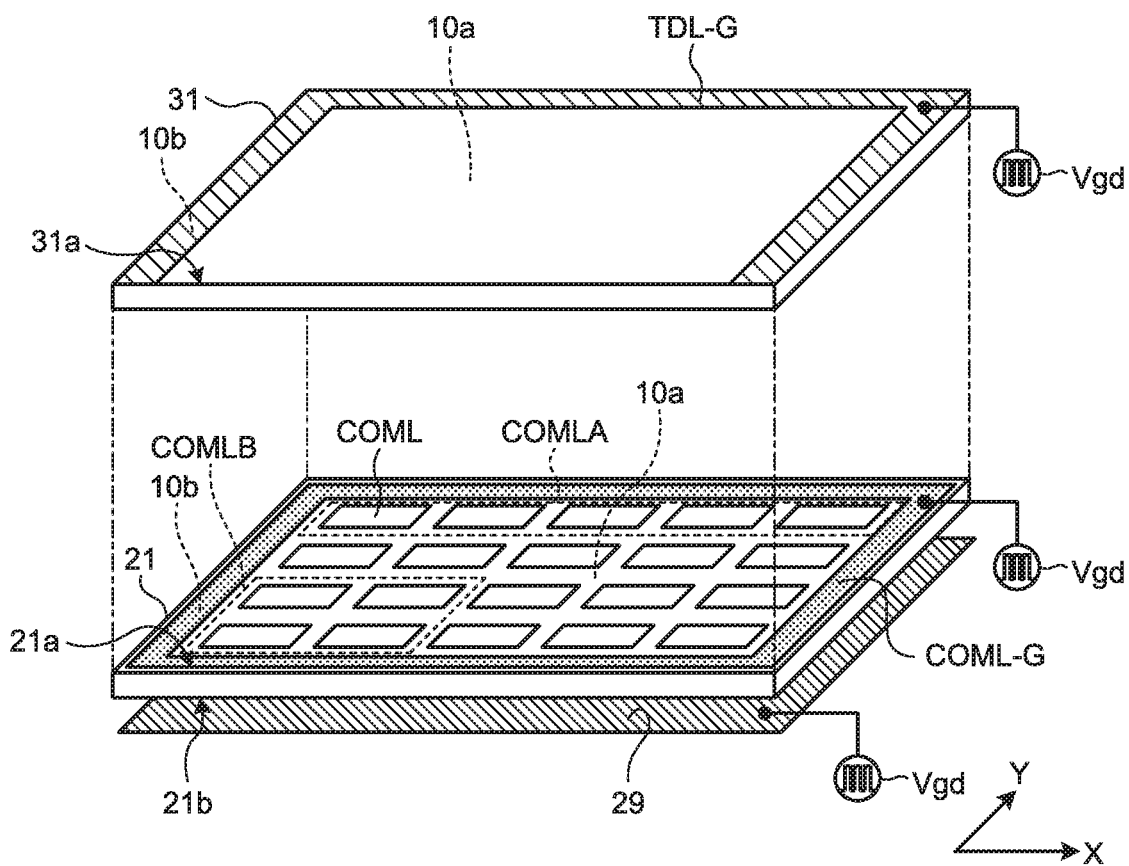
FIG. 21 is a perspective view of exemplary arrangement of the touch detection electrodes and the drive electrodes.

FIG. 21 is a perspective view of exemplary arrangement of the touch detection electrodes and the drive electrodes. As illustrated in FIG. 21, the touch detection electrodes TDL are provided in the display region 10a on a first surface 31a of the counter substrate 31. The first surface 31a is opposite to the surface facing the TFT substrate 21. The touch detection electrodes TDL extend in the column direction (Y-direction) in the display region 10a and are arrayed in the row direction (X-direction) in the display region 10a.

The touch detection electrodes TDL are made of a translucent conductive material, such as ITO. The touch detection electrodes TDL are not necessarily made of ITO and may include metal thin wires made of a metal material, for example. The ends of the touch detection electrodes TDL are coupled to the flexible substrate 41 (refer to FIG. 22, which will be described later) provided on the short side of the frame region 10b of the counter substrate 31.

As illustrated in FIG. 21, the frame region 10b on the first surface 31a of the counter substrate 31 is provided with a guard electrode TDL-G. The guard electrode TDL-G, for example, is provided continuously along the long side and the short sides of the display region 10a. When the display device 1 performs self-capacitance hover detection, the guard electrode TDL-G may be supplied with the guard signals Vgd having the same waveform as that of the detection drive signals Vcom and synchronized with the drive signals Vcom. Instead of being supplied with the guard signals Vgd, the guard electrode TDL-G may be brought into a state of not being electrically coupled to any component (high impedance). This mechanism can prevent generation of capacitance between the guard electrode TDL-G and the drive electrodes COML supplied with the detection drive signals Vcom. Consequently, the display device 1 can increase the sensitivity in hover detection.

The drive electrodes COML are provided in the display region 10a on a first surface 21a of the TFT substrate 21. The first surface 21a is the surface facing the counter substrate 31, for example. When the display device 1 performs mutual capacitance touch detection, a plurality of drive electrodes COML are coupled to one another in the row direction to serve as a plurality of drive electrode blocks COMLA. When the display device 1 performs self-capacitance hover detection, a plurality of drive electrodes COML are coupled to one another in the row direction (X-direction) and the column direction (Y-direction) to serve as a plurality of drive electrode blocks COMLB.

As illustrated in FIG. 21, the frame region 10b on the first surface 21a of the TFT substrate 21 is provided with a guard electrode COML-G. The guard electrode COML-G, for example, is provided continuously along the long sides and the short sides of the display region 10a and surrounds the display region 10a. When the display device 1 performs self-capacitance hover detection, the guard electrode COML-G may be supplied with the guard signals Vgd having the same waveform as that of the detection drive signals Vcom and synchronized with the drive signals Vcom. Alternatively, the guard electrode COML-G may be brought into a state of not being electrically coupled to any component (high impedance). This mechanism can prevent generation of capacitance between the guard electrode COML-G and the drive electrodes COML supplied with the drive signals Vcom. Consequently, the display device 1 can increase the sensitivity in hover detection.

The present embodiment may include a rear surface guard electrode 29 on a second surface 21b of the TFT substrate 21. The rear surface guard electrode 29 may cover part of the second surface 21b of the TFT substrate 21 or the whole thereof. The rear surface guard electrode 29 may be made of a translucent conductive material, such as ITO, or include a metal frame, which is not illustrated, for example. When the display device 1 performs self-capacitance hover detection, the rear surface guard electrode 29 may be supplied with the guard signals Vgd having the same waveform as that of the detection drive signals Vcom and synchronized with the drive signals Vcom. Alternatively, the rear surface guard electrode 29 may be brought into a state of not being electrically coupled to any component (high impedance). This mechanism can prevent generation of capacitance between the rear surface guard electrode 29 and the drive electrodes COML supplied with the drive signals Vcom. Consequently, the display device 1 can increase the sensitivity in hover detection.

When the display device 1 according to the present embodiment performs self-capacitance hover detection, the touch detection electrodes TDL may be supplied with the guard signals Vgd having the same waveform as that of the detection drive signals Vcom and synchronized with the drive signals Vcom. Alternatively, the touch detection electrodes TDL may be brought into a state of not being electrically coupled to any component (high impedance). This mechanism can prevent generation of capacitance between the touch detection electrodes TDL and the drive electrodes COML supplied with the drive signals Vcom. Consequently, the display device 1 can increase the sensitivity in hover detection.

Figure 22:
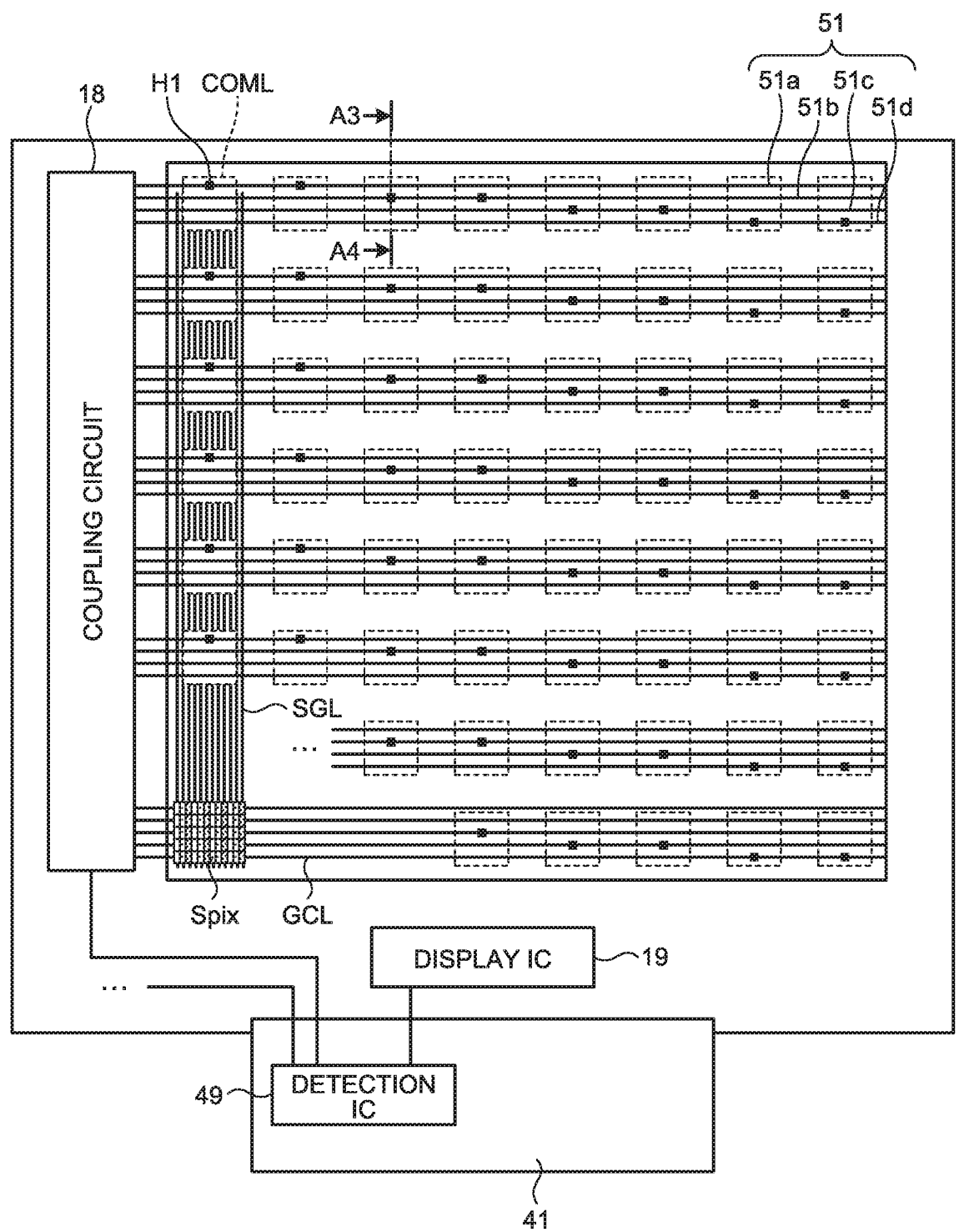
FIG. 22 is a diagram of an example of coupling between the drive electrodes and wiring.
Figure 23:
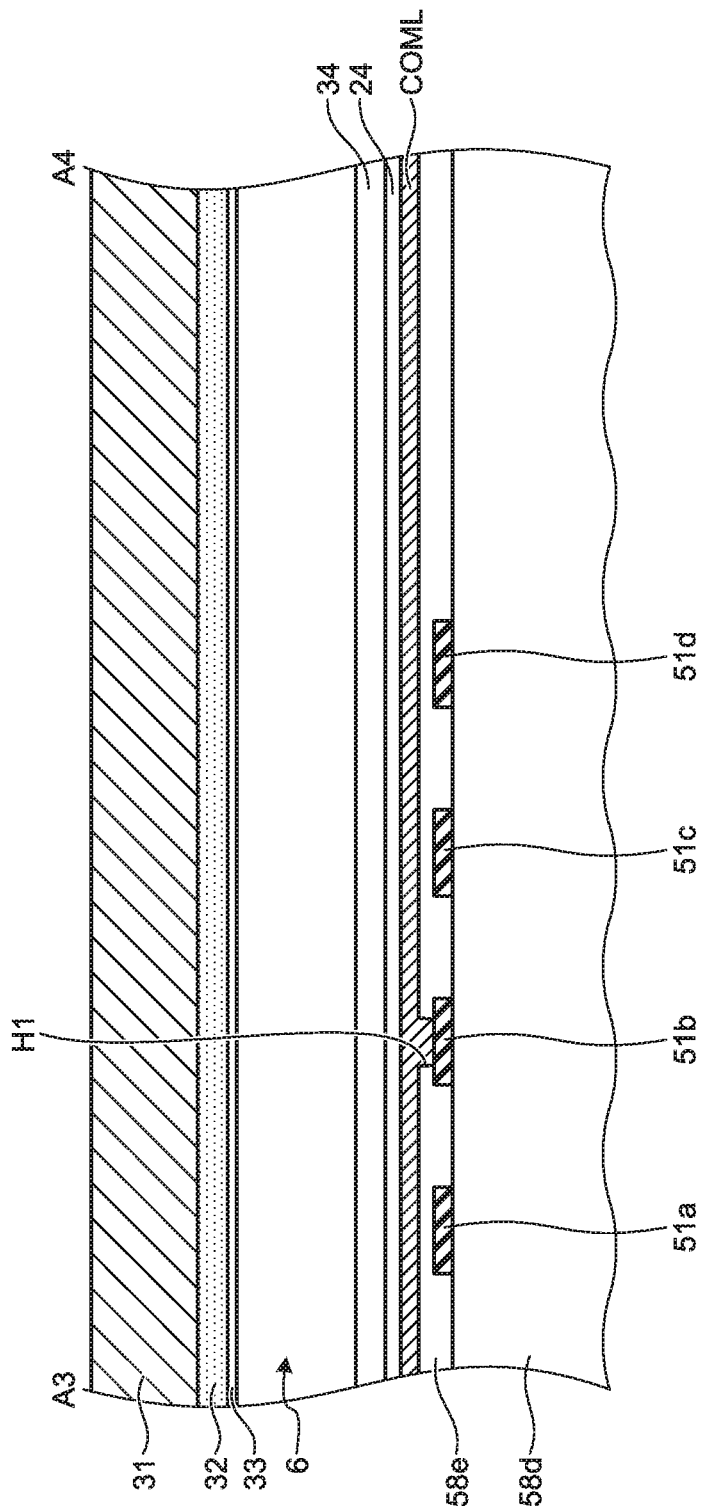
FIG. 23 is a sectional view along line A3-A4 in FIG. 22.
Figure 24:
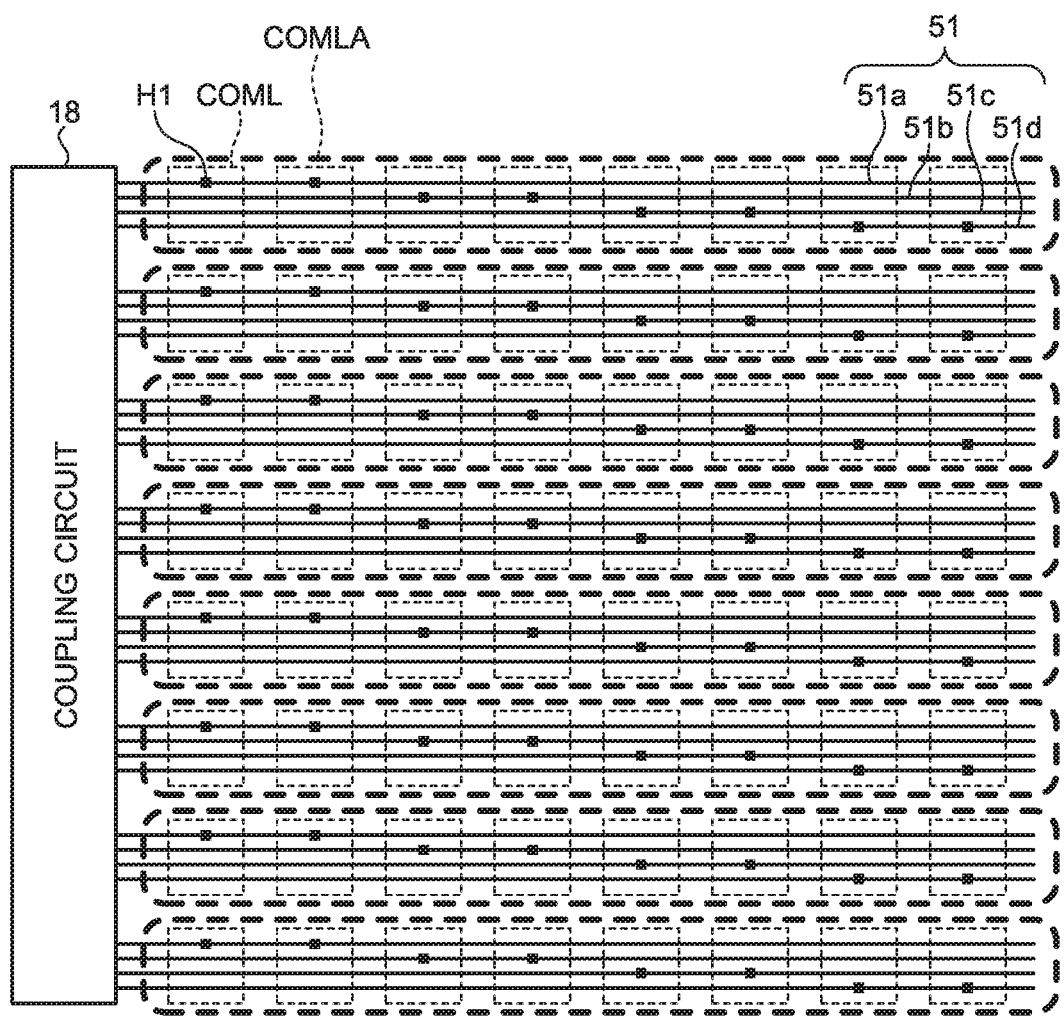
FIG. 24 is a diagram of an exemplary configuration of line-shaped drive electrode blocks.
Figure 25:
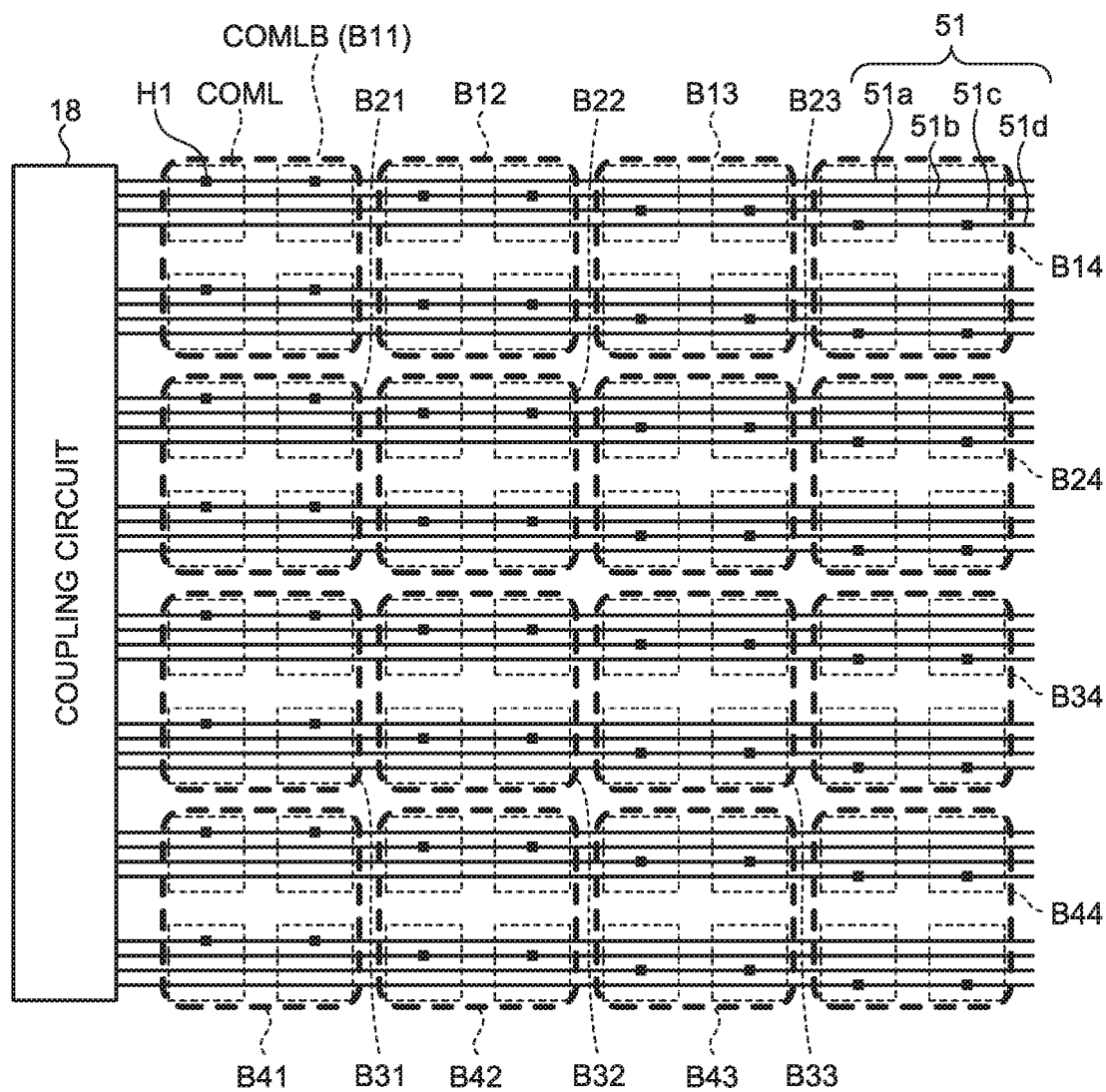
FIG. 25 is a diagram of an exemplary configuration of square-shaped drive electrode blocks.

FIG. 22 is a diagram of an example of coupling between the drive electrodes and wiring. FIG. 23 is a sectional view along line A3-A4 in FIG. 22. FIG. 24 is a diagram of an exemplary configuration of line-shaped drive electrode blocks. FIG. 25 is a diagram of an exemplary configuration of square-shaped drive electrode blocks. As illustrated in FIG. 22, the drive electrodes COML are disposed side by side in the row direction (X-direction) and the column direction (Y-direction) and formed into a plurality of rows and columns. In FIG. 22, the drive electrodes COML are disposed in eight rows and eight columns.

The wires 51 extend in the row direction and are coupled to the respective rows of the drive electrodes COML. One wire 51, for example, includes four wires 51a to 51d extending in the row direction. The four wires 51a to 51d are coupled to the drive electrodes COML in each row through the contact holes H1 formed in the insulating layer 24 (refer to FIG. 16). Specifically, the drive electrodes COML in the first row are coupled to the wire 51 as follows: the first and the second drive electrodes COML from the coupling circuit 18 side are coupled to the wire 51a, the third and the fourth drive electrodes COML are coupled to the wire 51b, the fifth and the sixth drive electrodes COML are coupled to the wire 51c, and the seventh and the eighth drive electrodes COML are coupled to the wire 51d. The drive electrodes COML in the other rows are also coupled to the wires 51a and 51d in the same manner as that of the first row.

The wires 51a to 51d are made of the same conductive material and have the same thickness. The wires 51a to 51d, for example, are produced simultaneously by the same process. As illustrated in FIG. 23, the wires Ma to 51d are provided on the same insulating layer 58d (refer to FIG. 16).

As illustrated in FIG. 22, the wires 51 are coupled to the coupling circuit 18. The coupling circuit 18 includes a multiplexer having 16 or more channels capable of inputting and outputting signals, for example. The coupling circuit 18 includes detection data lines SL1 to SL16. The detection data lines SL1 to SL16 are coupled to a detection IC 49. The coupling circuit 18 is provided in the frame region 10b (refer to FIG. 13) of the TFT substrate 21. Alternatively, the coupling circuit 18 may be included in the display IC 19.

The coupling circuit 18 switches coupling between the drive electrodes COML and the wires 51 based on the control signals transmitted from the drive electrode driver 14. As illustrated in FIG. 24, the coupling circuit 18 can couple a plurality of drive electrodes COML in the row direction to form the drive electrode blocks COMLA. As illustrated in FIG. 25, the coupling circuit 18 can also couple a plurality of drive electrodes COML in the row direction and the column direction to form the drive electrode blocks COMLB. While the coupling circuit 18 couples the drive electrodes COML in both of the row direction and the column direction to form the drive electrode blocks COMLB in FIG. 25, the configuration is not limited thereto. The coupling circuit 18, for example, may couple a plurality of drive electrodes COML in the column direction to form the drive electrode blocks COMLB. The coupling circuit 18 may couple a plurality of drive electrodes COML in the row direction to form the drive electrode blocks COMLA and couple a plurality of drive electrodes COML in the column direction to form the drive electrode blocks COMLB.

Figure 26:
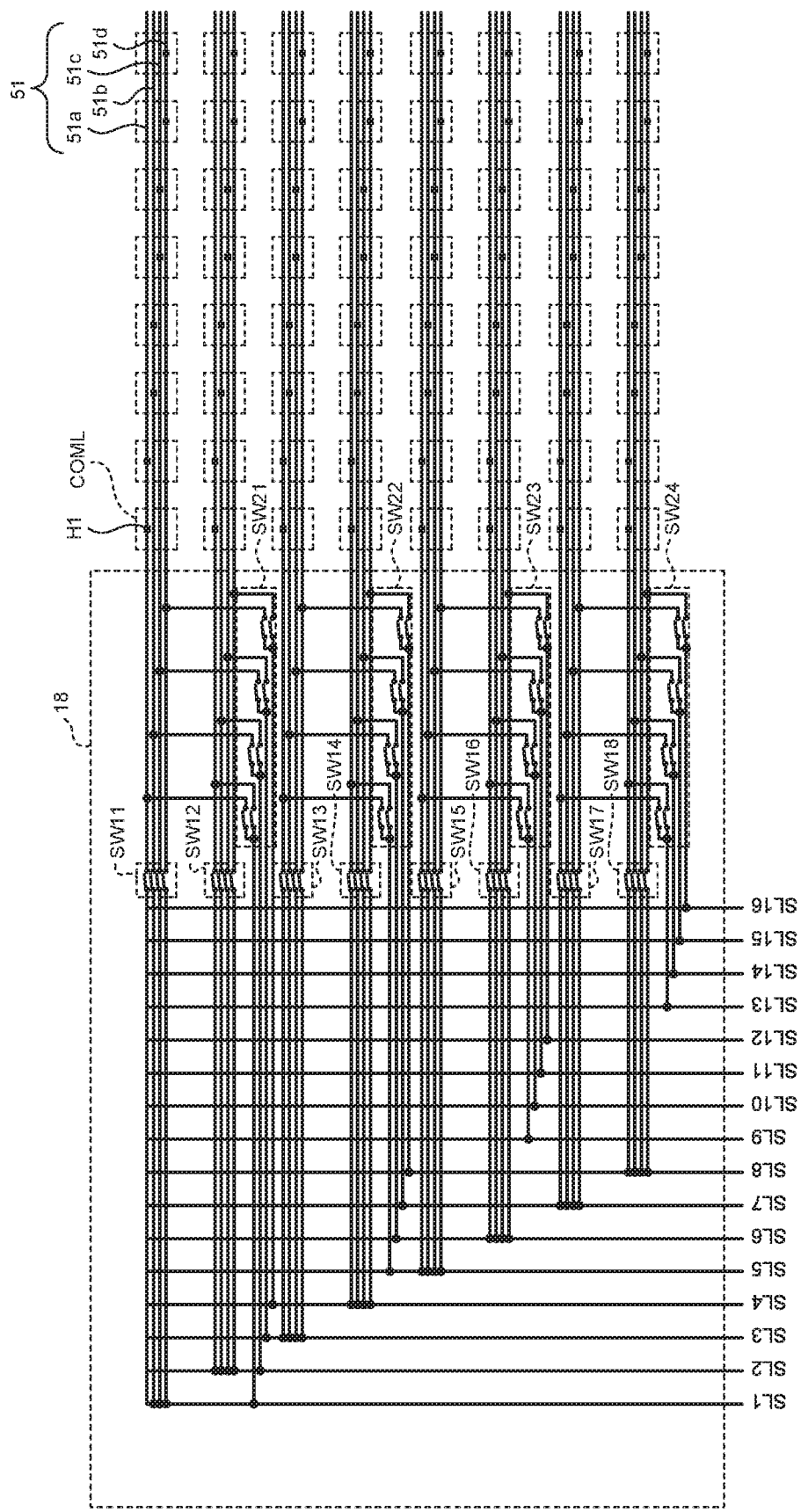
FIG. 26 is a diagram of an exemplary configuration of a coupling circuit.

FIG. 26 is a diagram of an exemplary configuration of the coupling circuit. As illustrated in FIG. 26, the coupling circuit 18 includes a plurality of switching elements SW11 to SW18 and SW21 to SW24. The switching elements SW11 to SW18 and SW21 to SW24 are coupled to the respective wires 51 and couple or cut off between one of the wires 51 (first wire) and the other thereof (second wire). Coupling between the drive electrodes COML can be switched between a coupled state and a non-coupled state by the switching elements SW11 to SW18 and SW21 to SW24.

When the switching elements SW11 to SW18 are turned on, and the switching elements SW21 to SW24 are turned off, the drive electrodes COML are coupled to one another in the row direction to serve as the drive electrode blocks COMLA (refer to FIG. 24). Eight drive electrodes COML disposed side by side, for example, are coupled in the row direction to serve as one drive electrode block COMLA. FIG. 24 illustrates an example of the present embodiment in which eight drive electrode blocks COMLA are formed out of 64 drive electrodes COML arrayed at regular intervals in the row direction and the column direction. The eight drive electrode blocks COMLA are arrayed at regular intervals in the column direction. The eight drive electrode blocks COMLA are coupled to the detection data lines SL1 to SL8 via the switching elements SW11 to SW18, respectively.

By contrast, when the switching elements SW11 to SW18 are turned off, and the switching elements SW21 to SW24 are turned on, the drive electrodes COML are coupled to one another in the row direction and the column direction to serve as the drive electrode blocks COMLB (refer to FIG. 25). Drive electrodes COML disposed side by side in the row direction and the column direction, for example, are coupled to one another to serve as one drive electrode block COMLB including four drive electrodes COML. In FIG. 25, 16 drive electrode blocks COMLB are formed out of the 64 drive electrodes COML. The drive electrode block COMLB has a rectangular or square shape in planar view. The 16 drive electrode blocks COMLB are arrayed at regular intervals in the row direction and the column direction. The 16 drive electrode blocks COMLB are coupled to the detection data lines SL1 to SL16, respectively, via the switching elements SW21 to SW24.

Figure 27:
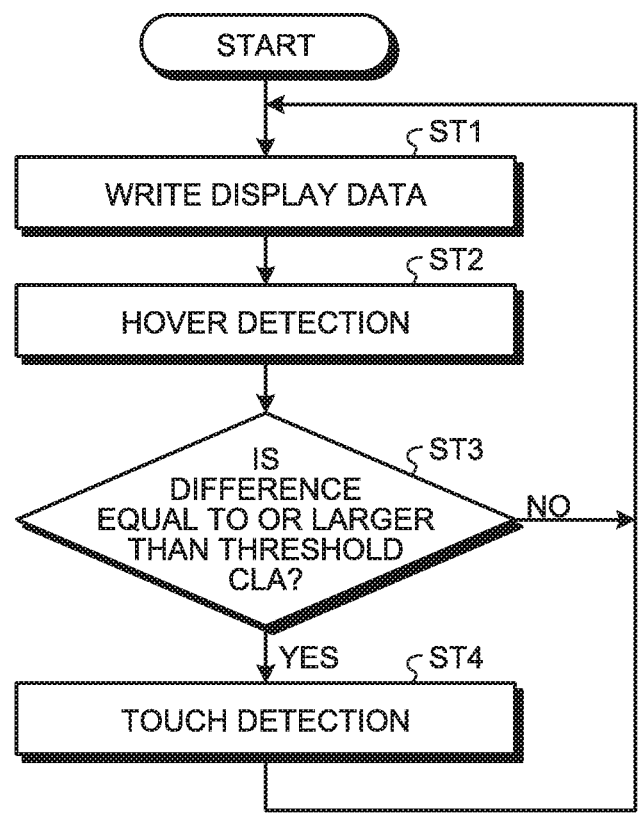
FIG. 27 is a flowchart of a detection operation according to the first embodiment.
Figure 28:
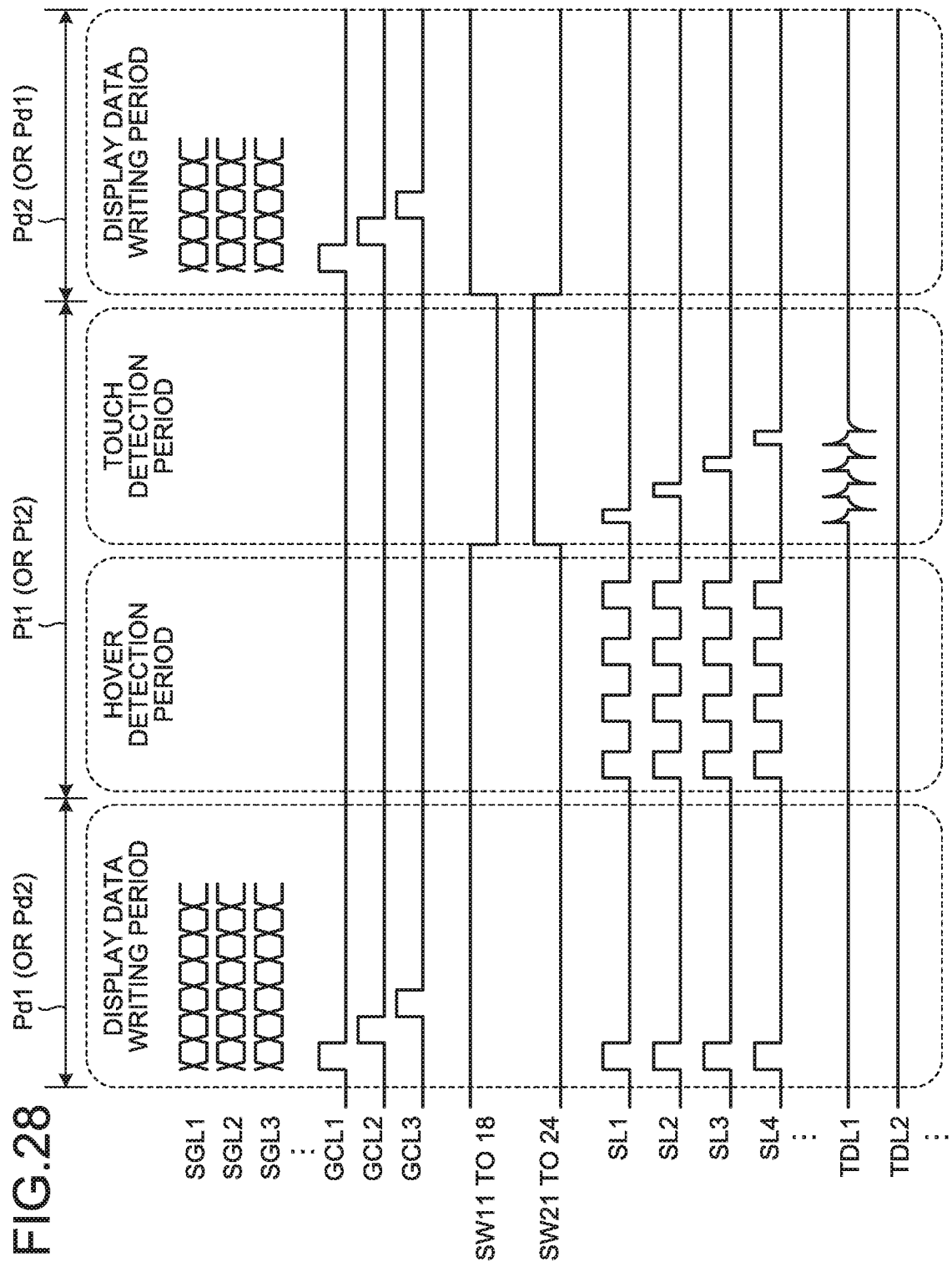
FIG. 28 is a timing waveform chart of an exemplary operation performed by the display device.
Figure 29:
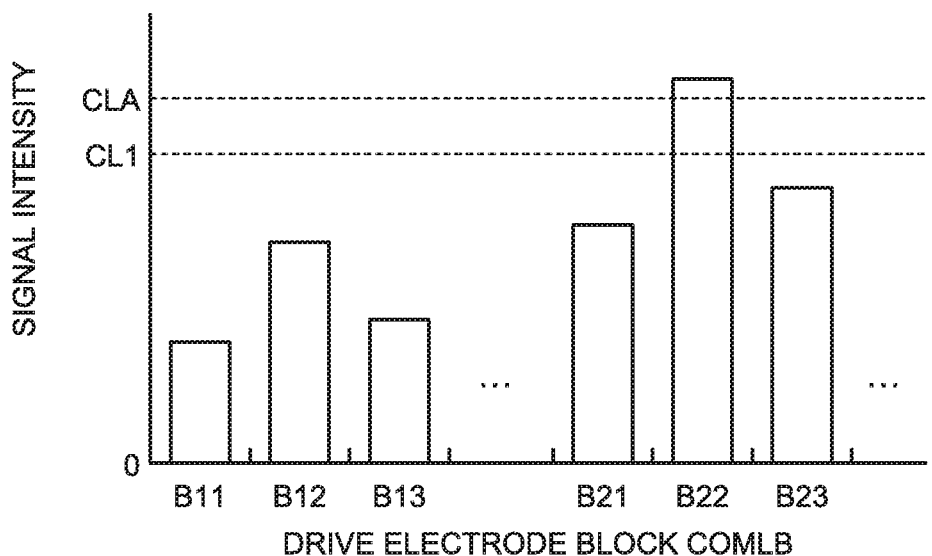
FIG. 29 is a diagram of an example of thresholds according to the first embodiment.
Figure 30:
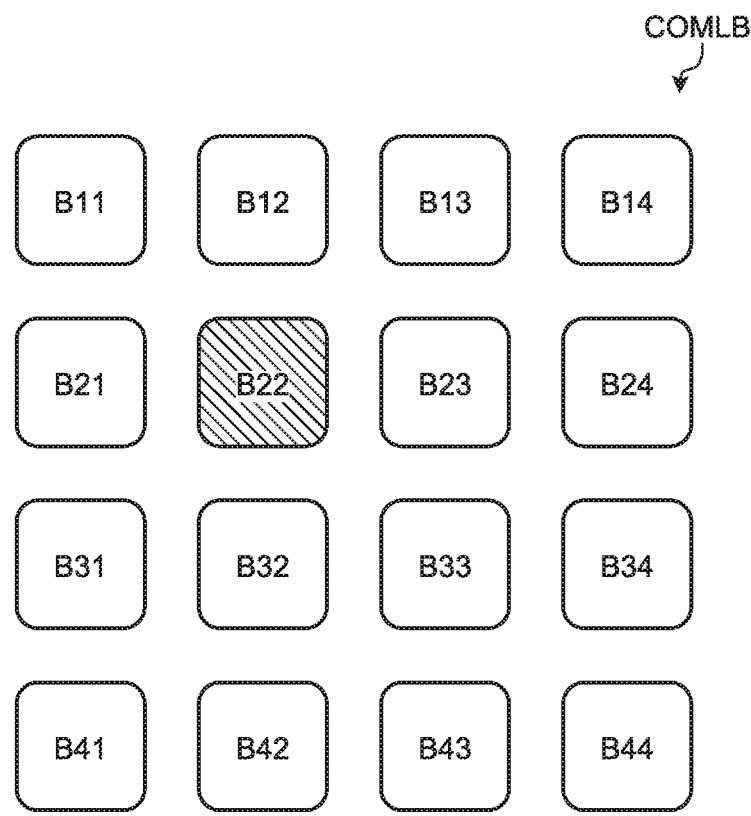
FIG. 30 is a diagram of an example of a detection position of an object to be detected in hover detection.

The following describes a specific example of the detection operation according to the first embodiment. FIG. 27 is a flowchart of the detection operation according to the first embodiment. FIG. 28 is a timing waveform chart of an exemplary operation performed by the display device. FIG. 29 is a diagram of an example of thresholds according to the first embodiment. The horizontal axis of FIG. 29 indicates the position of the drive electrode blocks COMLB. The vertical axis of FIG. 29 indicates the signal intensity. The signal intensity corresponds to the difference (absolute value $|\Delta VB|$) of the detection signal Vdet2 output from the drive electrode block COMLB. CL1 in the vertical axis of FIG. 29 indicates a threshold for hover detection performed using the drive electrode blocks COMLB as detection electrodes. CLA in the vertical axis of FIG. 29 indicates a threshold for determining whether it is necessary to perform mutual capacitance touch detection. The threshold CLA is equal to or larger than the threshold CL1 (CLA≥CL1). FIG. 30 is a diagram of an example of a detection position of an object to be detected in hover detection. In FIG. 30, the difference $|\Delta VB|$ of the detection signal Vdet2 output from the drive electrode block COMLB (B22) out of the drive electrode blocks COMLB (B11 to B14, B21 to B24, B31 to B34, and B41 to B44) is equal to or larger than the threshold CL1 and the threshold CLA.

As illustrated in FIG. 28, the detection operation periods Pt1 and Pt2 according to the present embodiment each have a self-capacitance hover detection period and a mutual capacitance touch detection period. Step ST1 illustrated in FIG. 27 corresponds to the display operation period Pd1 or Pd2. Steps ST2 and ST3 correspond to the hover detection period in the detection operation period Pt1 or Pt2. Step ST4 corresponds to the touch detection period in the detection operation period Pt1 or Pt2.

At Step ST1 in FIG. 27, the controller 11 (refer to FIG. 1) causes the gate driver 12 (refer to FIG. 1), the source driver 13 (refer to FIG. 1), and the drive electrode driver 14 (refer to FIG. 1) to write display data to the display portion 20 (refer to FIG. 1). Specifically, the drive electrode driver 14 transmits the control signals to the coupling circuit 18 (refer to FIG. 26), thereby turning on the switching elements SW11 to SW18 and turning off the switching elements SW21 to SW24. As a result, the drive electrodes COML serve as the drive electrode blocks COMLA. The drive electrode driver 14 supplies the display drive signals Vcomdc serving as a common electrode potential for display to the detection data lines SL1 to SL16 of the coupling circuit 18. As a result, the electric potential of the drive electrode blocks COMLA is fixed to that of the display drive signals Vcomdc. In this state, the gate driver 12 sequentially outputs the controls signals to gate lines GCL1, GCL2, GCL3, . . . , and the source driver 13 sequentially outputs the pixel signals Vpix to data lines SGL1, SGL2, SGL3, . . . . The controller 11 thus sequentially supplies the pixel signals Vpix to the pixels Pix (refer to FIG. 14) in a plurality of rows selected in the display operation period Pd1, thereby writing display data.

At Step ST2 in FIG. 27, the drive electrode driver 14 and the detector 40 (refer to FIG. 1) perform hover detection. The hover detection is performed by the self-capacitance method using the drive electrode blocks COMLB as detection electrodes. Specifically, the drive electrode driver 14 transmits the control signals to the coupling circuit 18 (refer to FIG. 26), thereby turning off the switching elements SW11 to SW18 and turning on the switching elements SW21 to SW24. As a result, the drive electrodes COML serve as the drive electrode blocks COMLB (B11 to B14, B21 to B24, B31 to B34, and B41 to B44) as illustrated in FIG. 25. In this state, the drive electrode driver 14 supplies the detection drive signals Vcom to the detection data lines SL1 to SL16 of the coupling circuit 18. The drive electrode driver 14, for example, supplies the detection drive signals Vcom having the same waveform synchronously to the detection data lines SL1 to SL16. As a result, the detection signals Vdet2 based on capacitance changes in the drive electrode blocks COMLB are output from the respective drive electrode blocks COMLB simultaneously.

The detector 40 acquires the detection signals Vdet2 output from the respective drive electrode blocks COMLB via the detection data lines SL1 to SL16. The detector 40 performs arithmetic processing based on the acquired detection signals Vdet2 and determines whether an object to be detected is present in hover detection based on the result of the arithmetic processing. At Step ST2 in FIG. 27, for example, the differences $|\Delta VB|$ of the detection signals Vdet2 output from the drive electrode blocks COMLB (B11 to B14, B21 to B24, B31 to B34, and B41 to B44) are compared with the threshold CL1 illustrated in FIG. 29. The comparison is performed by the signal processor 44 (refer to FIG. 2) of the detector 40, for example.

If one or more of the differences $|\Delta VB|$ of the detection signals Vdet2 output from the respective drive electrode blocks COMLB are equal to or larger than the threshold CL1, the signal processor 44 determines that an object to be detected is detected in hover detection. In this case, the coordinate extractor 45 (refer to FIG. 2) of the detector 40 determines the position of the drive electrode block COMLB that outputs a difference $|\Delta VB|$ of equal to or larger than the threshold CL1 to be the position of the object to be detected. In the example illustrated in FIGS. 29 and 30, the signal processor 44 determines that an object to be detected is detected in the drive electrode block COMLB (B22). The coordinate extractor 45 determines the position of the drive electrode block COMLB (B22) on the display panel 10 to be the position of the object to be detected in hover detection. By contrast, if all the differences $|\Delta VB|$ of the detection signals Vdet2 output from the respective drive electrode blocks COMLB are smaller than the threshold CL1, the signal processor 44 determines that an object to be detected is not detected in hover detection.

At Step ST3 in FIG. 27, the detector 40 determines whether it is necessary to perform mutual capacitance touch detection based on the detection signals Vdet2 acquired in hover detection (Step ST2). In other words, the detector 40 predicts whether an object to be detected can be detected if it performs mutual capacitance touch detection based on the detection result of the hover detection. If the detector 40 predicts that an object to be detected can be detected in touch detection, the detector 40 performs touch detection.

Specifically, the signal processor 44 (refer to FIG. 2) of the detector 40 compares the differences $|\Delta VB|$ of the detection signals Vdet2 output from the respective drive electrode blocks COMLB with the threshold CLA. If one or more of the differences $|\Delta VB|$ of the detection signals Vdet2 output from the respective drive electrode blocks COMLB are equal to or larger than the threshold CLA, the signal processor 44 determines that it is necessary to perform mutual capacitance touch detection. In the example illustrated in FIGS. 29 and 30, an object to be detected is detected at intensity higher than the threshold CLA in the drive electrode block COMLB (B22). As a result, the signal processor 44 determines that it is necessary to perform mutual capacitance touch detection. By contrast, if all the differences |ΔVB| of the detection signals Vdet2 output from the respective drive electrode blocks COMLB are smaller than the threshold CLA, the signal processor 44 determines that it is not necessary to perform mutual capacitance touch detection.

If the signal processor 44 determines that it is necessary to perform mutual capacitance touch detection (Yes at Step ST3), the process proceeds to Step ST4 in FIG. 27. If the signal processor 44 determines that it is not necessary to perform mutual capacitance touch detection (No at Step ST3), the process is returned to Step ST1. As described above, the signal processor 44 determines in advance whether it is necessary to perform mutual capacitance touch detection (Step ST4) at Step ST3. If the signal processor 44 determines that it is not necessary to perform touch detection, the detector 40 can omit the detection operation at Step ST4, thereby reducing the power consumption required for touch detection. The detector 40 can increase the number of times of hover detection (Step ST2) by the omission of Step ST4.

At Step ST4 in FIG. 27, the drive electrode driver 14 and the detector 40 perform mutual capacitance touch detection. Specifically, the drive electrode driver 14 turns on the switching elements SW11 to SW18 of the coupling circuit 18 and turns off the switching elements SW21 to SW24 of the coupling circuit 18. As a result, the drive electrodes COML serve as the drive electrode blocks COMLA. In this state, the drive electrode driver 14 supplies the detection drive signals Vcom to the detection data lines SL1 to SL16 of the coupling circuit 18. The drive electrode driver 14, for example, supplies the detection drive signals Vcom having the same waveform to the detection data lines SL1 to SL16 at respective different timings. As a result, the detection signals Vdet1 are sequentially output from the touch detection electrodes TDL based on changes in capacitance between the drive electrode blocks COMLA and the touch detection electrodes TDL. The detector 40 acquires the detection signals Vdet1 output from the respective touch detection electrodes TDL via the detection data lines SL1 to SL16. The detector 40 performs arithmetic processing based on the acquired detection signals Vdet1 and determines whether an object to be detected is present in touch detection based on the result of the arithmetic processing. In FIG. 28, the detection signal Vdet1 is output from a touch detection electrode TDL1 out of touch detection electrodes TDL1, TDL2, ....

After Step ST4, the process is returned to Step ST1, and the display operation period Pd2 starts. After the display operation period Pd2, the detection operation period Pt2 starts.

If an object to be detected is detected by hover detection or touch detection in the detection operation period Pt1 in one frame period in FIG. 18, display data reflecting the detection result is written to the display portion 20 in the display operation period Pd2 in the next frame period, for example. Similarly, if an object to be detected is detected by hover detection or touch detection in the detection operation period Pt2 in one frame period, display data reflecting the detection result is written to the display portion 20 in the display operation period Pd1 in the next frame period, for example.

As described above, the display device 1 according to the first embodiment includes a plurality of drive electrodes COML, a plurality of touch detection electrodes TDL, the detector 40, and the coupling circuit 18. The drive electrodes COML are disposed side by side in the row direction and the column direction. The touch detection electrodes TDL are disposed on the side facing the drive electrodes COML and extend in the column direction. The detector 40 receives the detection signals Vdet1 output from the touch detection electrodes TDL based on changes in capacitance between the drive electrodes COML and the touch detection electrodes TDL or the detection signals Vdet2 output from the drive electrodes COML based on changes in capacitance in the drive electrodes COML. The coupling circuit 18 couples a plurality of drive electrodes COML to one another in the row direction to form the drive electrode blocks COMLA in the period when the detector 40 receives the detection signals Vdet1. The coupling circuit 18 couples at least two or more of the drive electrodes COML to one another in at least the column direction to form the second drive electrode blocks COMLB in the period when the detector 40 receives the detection signals Vdet2. The coupling circuit 18, for example, couples at least two or more of the drive electrodes COML to one another in the row direction and the column direction to form the second drive electrode blocks COMLB. The second drive electrode block COMLB has a larger number of drive electrodes COML arrayed in the column direction than that of the drive electrode block COMLA.

In touch detection, the drive electrode driver 14 sequentially supplies the drive signals Vcom to the drive electrodes COML included in the drive electrode block COMLA. The detector 40 detects touch input based on the detection signals Vdet1 output from the touch detection electrodes TDL. Consequently, the display device 1 can perform touch detection with detection accuracy corresponding to the array pitch of the drive electrode blocks COMLA. In hover detection, the drive electrode driver 14 simultaneously and collectively supplies the drive signals Vcom to the drive electrodes COML included in the drive electrode block COMLB. The detector 40 can perform hover detection based on the detection signals Vdet2 collectively output from one drive electrode block COMLB. As a result, the lines of electric force of an electric field generated from the drive electrode block COMLB reach a position farther away from the display surface. Consequently, the display device 1 can increase the detection sensitivity in hover detection and satisfactorily detect an object to be detected in the non-contact state.

Consequently, the display device 1 can perform accurate touch detection and satisfactory hover detection using the drive electrodes COML both in touch detection and hover detection.

The drive electrode driver 14 supplies the detection drive signals Vcom to the selected wires 51 via the coupling circuit 18. The detection signals Vdet2 output from the drive electrodes COML are output to the detector 40 via the coupling circuit 18. With the coupling circuit 18 provided between the wires 51 and the detection data lines SL1 to SL16, the display device 1 can switch coupling between the drive electrodes COML in a simpler manner.

In the first embodiment, the row direction corresponds to a "first direction" according to the present disclosure, and the column direction corresponds to a "second direction" according to the present disclosure. The drive electrode COML corresponds to a "first electrode" according to the present disclosure, and the touch detection electrode TDL corresponds to a "second electrode" according to the present disclosure. The detection signal Vdet1 corresponds to a "first detection signal" according to the present disclosure, and the detection signal Vdet2 corresponds to a "second detection signal" according to the present disclosure. The drive electrode block COMLA corresponds to a "first drive electrode block" according to the present disclosure, and the drive electrode block COMLB corresponds to a "second drive electrode block" according to the present disclosure. The drive electrode driver 14 corresponds to a "drive circuit" according to the present disclosure. The pixel substrate 2 corresponds to a "substrate" according to the present disclosure. The device including the drive electrodes COML, the touch detection electrodes TDL, the detector 40, and the coupling circuit 18 corresponds to a "detection device" according to the present disclosure. A "display device" according to the present disclosure includes the detection device, the pixel substrate 2, and the liquid crystal layer 6. The pixel substrate 2 has the display region 10a and the frame region 10b. The liquid crystal layer 6 displays an image in the display region 10a. The display region 10a is provided with the drive electrodes COML.

Modifications of the First Embodiment

To detect hover, the first embodiment sets the threshold CL1 (refer to FIG. 29) for the difference |ΔVB| of the detection signal Vdet2 output from the drive electrode block COMLB. The number of thresholds for the difference |ΔVB| according to the first embodiment, however, is not limited to one and may be two or more. A modification of the first embodiment sets two or more thresholds for the difference |ΔVB|.

Figure 32:
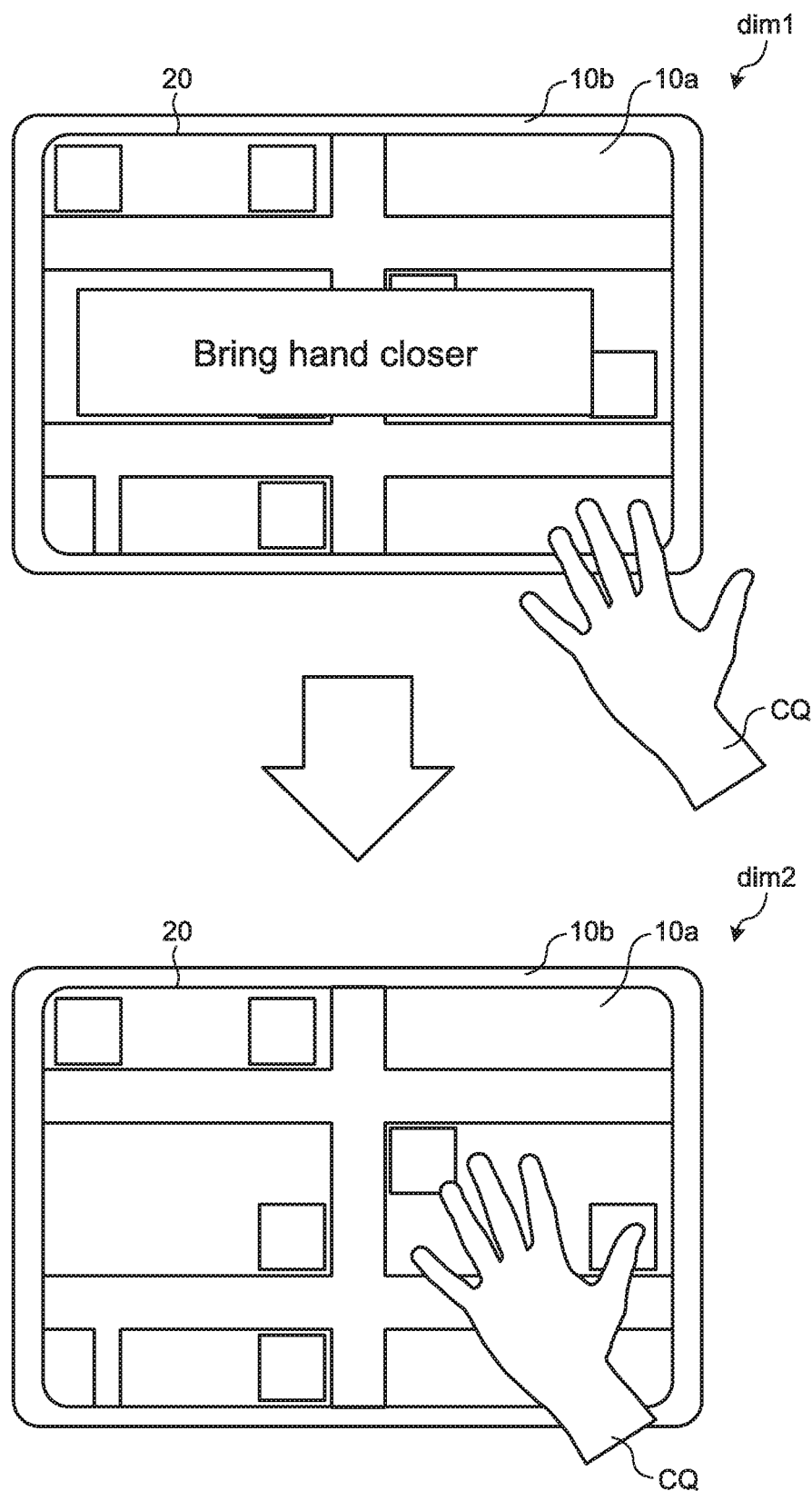
FIG. 32 is a diagram of an example of an image displayed on the display panel.

FIG. 31 is a diagram of an example of the thresholds in hover detection according to the modification of the first embodiment. FIG. 32 is a diagram of an example of an image displayed on the display panel. In two graphs gr11 and gr12 illustrated in FIG. 31, the horizontal axis indicates the position of the drive electrode blocks COMLB, and the vertical axis indicates the signal intensity. The signal intensity corresponds to the difference (absolute value |ΔVB|) of the detection signal Vdet2 output from the drive electrode block COMLB. As indicated by the vertical axis in FIG. 31, the modification of the first embodiment sets the threshold CL1 and a threshold CL2 smaller than the threshold CL1 (CL1>CL2) as the thresholds for hover detection.

The following specifically describes the modification of the first embodiment. At Step ST2 illustrated in FIG. 27, the modification of the first embodiment compares the differences |ΔVB| of the detection signals Vdet2 output from the drive electrode blocks COMLB (B11 to B14, B21 to B24, B31 to B34, and B41 to B44) with the thresholds CL1 and CL2. The comparison is performed by the signal processor 44 (refer to FIG. 2) of the detector 40, for example. If one or more of the differences |ΔVB| of the detection signals Vdet2 output from the respective drive electrode blocks COMLB are equal to or larger than the threshold CL1, the signal processor 44 determines that the object to be detected CQ is detected in hover detection. The coordinate extractor 45 (refer to FIG. 2) of the detector 40 determines the position of the drive electrode block COMLB that outputs a difference |ΔVB| of equal to or larger than the threshold CL1 to be the position of the object to be detected CQ. By contrast, if all the differences |ΔVB| of the detection signals Vdet2 output from the respective drive electrode blocks COMLB are smaller than the threshold CL2, the signal processor 44 determines that the object to be detected CQ is not detected in hover detection.

As illustrated in the graph gr11 of FIG. 31, if all the differences |ΔVB| of the detection signals Vdet2 output from the respective drive electrode blocks COMLB are smaller than the threshold CL1, and one or more of the differences |ΔVB| are equal to or larger than the threshold CL2, the signal processor 44 determines that the object to be detected CQ is not detected in hover detection. In the graph gr11 of FIG. 31, the difference |ΔVB| of the detection signal Vdet2 output from the drive electrode block COMLB (B22) is smaller than the threshold CL1 and equal to or larger than the threshold CL2.

In the case illustrated in the graph gr11 of FIG. 31, the controller 11 (refer to FIG. 1) causes the display panel 10 to display a notice (e.g., "Bring hand closer") for urging the user to bring his/her hand closer as indicated by an image dim1 in FIG. 32. The notice is not limited to an image and may be speech output from a speaker or the like included in the display device 1 (refer to FIG. 1) or both of an image and speech. In response to the notice, the user may possibly bring his/her hand closer to the touch sensor 30. If the hand comes closer to the touch sensor 30, and the intensity of the difference |ΔVB| of the detection signal Vdet2 output from the drive electrode block COMLB is equal to or larger than the threshold CL1 as illustrated in the graph gr12 of FIG. 31, the signal processor 44 determines that the object to be detected CQ is detected in hover detection. As a result, the user can perform hover input. The image dim2 in FIG. 32 illustrates, as an example of hover input, a case where the user moves his/her hand in the vertical and horizontal directions without bringing it into contact with the display panel 10, thereby scrolling a map displayed on the display panel 10 in the vertical and horizontal directions corresponding to the movement of the hand.

Also in the present modification, the process may proceed from Step ST2 to Step ST3 illustrated in FIG. 27. At Step ST3 in FIG. 27, the differences |ΔVB| of the detection signals Vdet2 output from the respective drive electrode blocks COMLB are compared with the threshold CLA. In the example illustrated in the graph gr12 of FIG. 31, the object to be detected is detected in hover detection, but all the differences |ΔVB| of the detection signals Vdet2 output from the respective drive electrode blocks COMLB are smaller than the threshold CLA. In the example illustrated in the graph gr12 of FIG. 31, the signal processor 44 determines that it is not necessary to perform mutual capacitance touch detection.

Second Embodiment

To perform hover detection, the controller 11 according to the first embodiment couples two drive electrodes COML in the row direction and the column direction, that is, the total of four drive electrodes COML to form one drive electrode block COMLB. The number of drive electrodes COML coupled in hover detection according to the present embodiment is not limited to four. The present embodiment may couple five or more drive electrodes COML to form one drive electrode block in hover detection.

To perform hover detection, the controller 11 according to the present embodiment may change the number of drive electrodes COML serving as one drive electrode block. As a result, the electrode size of the drive electrode block is changed. The controller 11, for example, may switch coupling between a plurality of drive electrodes COML via a coupling circuit 18A, thereby changing the number of drive electrodes COML serving as one drive electrode block.

Figure 33:
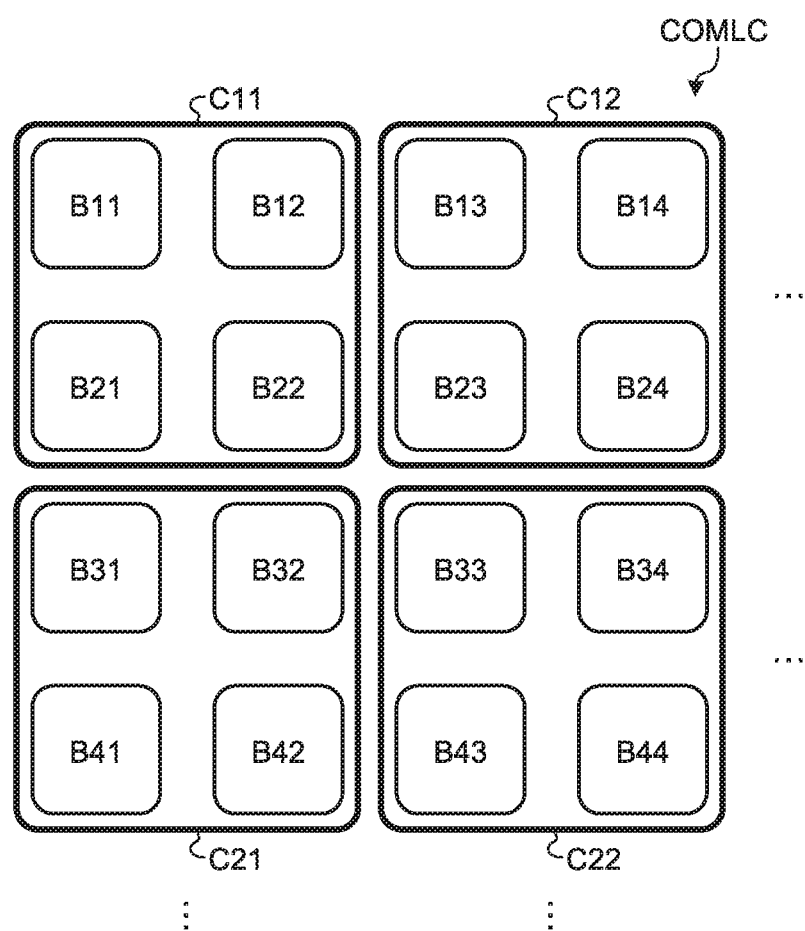
FIG. 33 is a diagram of an exemplary configuration of the drive electrode blocks according to a second embodiment of the present disclosure.
Figure 34:
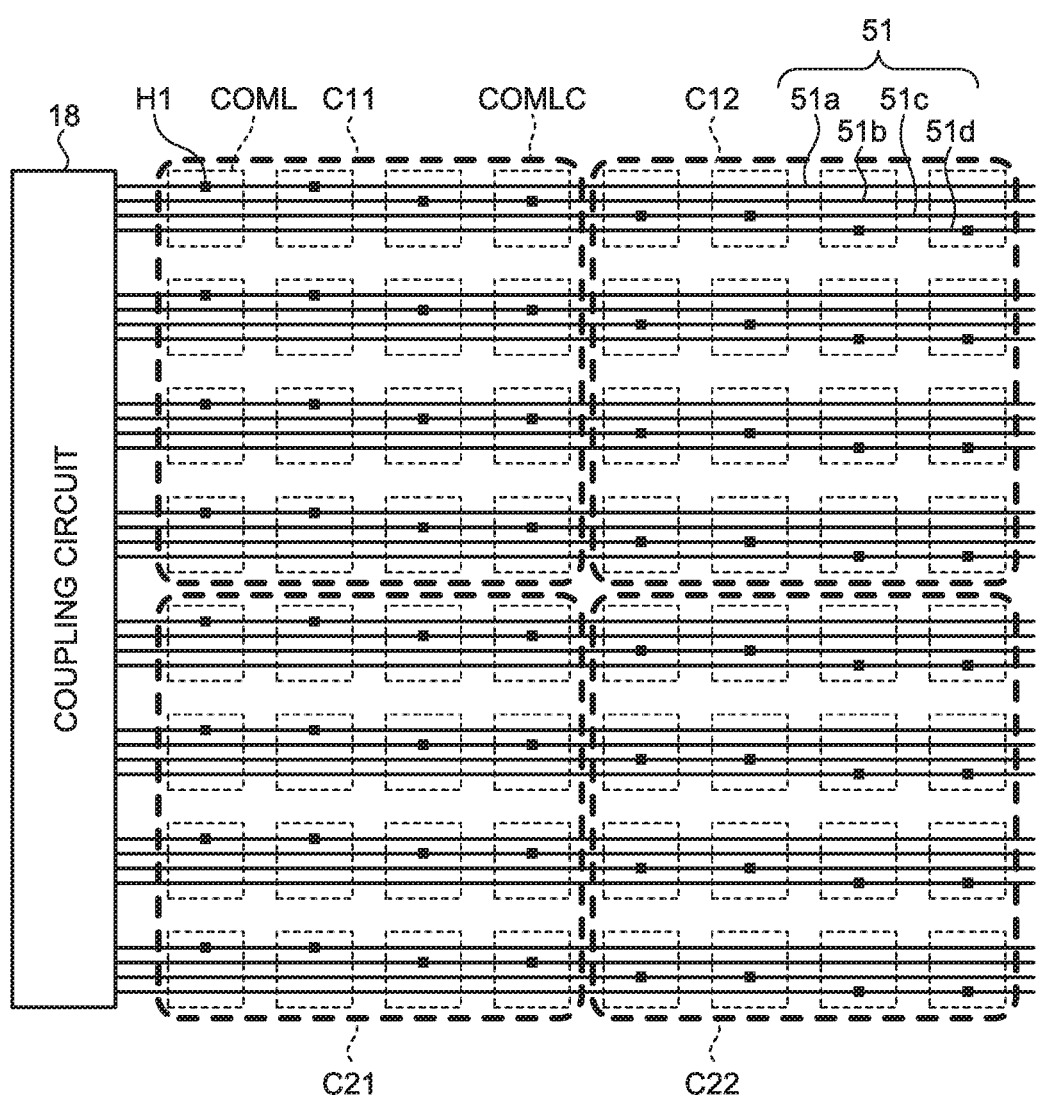
FIG. 34 is another diagram of an exemplary configuration of the drive electrode blocks according to the second embodiment.

FIGS. 33 and 34 are diagrams of an exemplary configuration of the drive electrode blocks according to a second embodiment of the present disclosure. To perform self-capacitance hover detection, the controller 11 according to the second embodiment couples four drive electrodes COML in the row direction and the column direction, that is, the total of 16 drive electrodes COML to form drive electrode blocks COMLC as illustrated in FIGS. 33 and 34. The drive electrode block COMLC has a rectangular or square shape in planar view. The drive electrode block COMLC includes a larger number of drive electrodes COML than that of the drive electrode block COMLB and thus has a larger electrode size corresponding to the increase in the number of drive electrodes COML. The drive electrode block COMLC, for example, includes four drive electrode blocks COMLB and has an electrode size four times the size of the drive electrode block COMLB. With this configuration, the drive electrode block COMLC outputs a larger difference $|\Delta V|$ of the detection signal Vdet2 and has higher detection sensitivity than those of the drive electrode block COMLB. Consequently, the present embodiment can detect an object to be detected present at a higher position with respect to the display panel 10 in hover detection.

Figure 35:
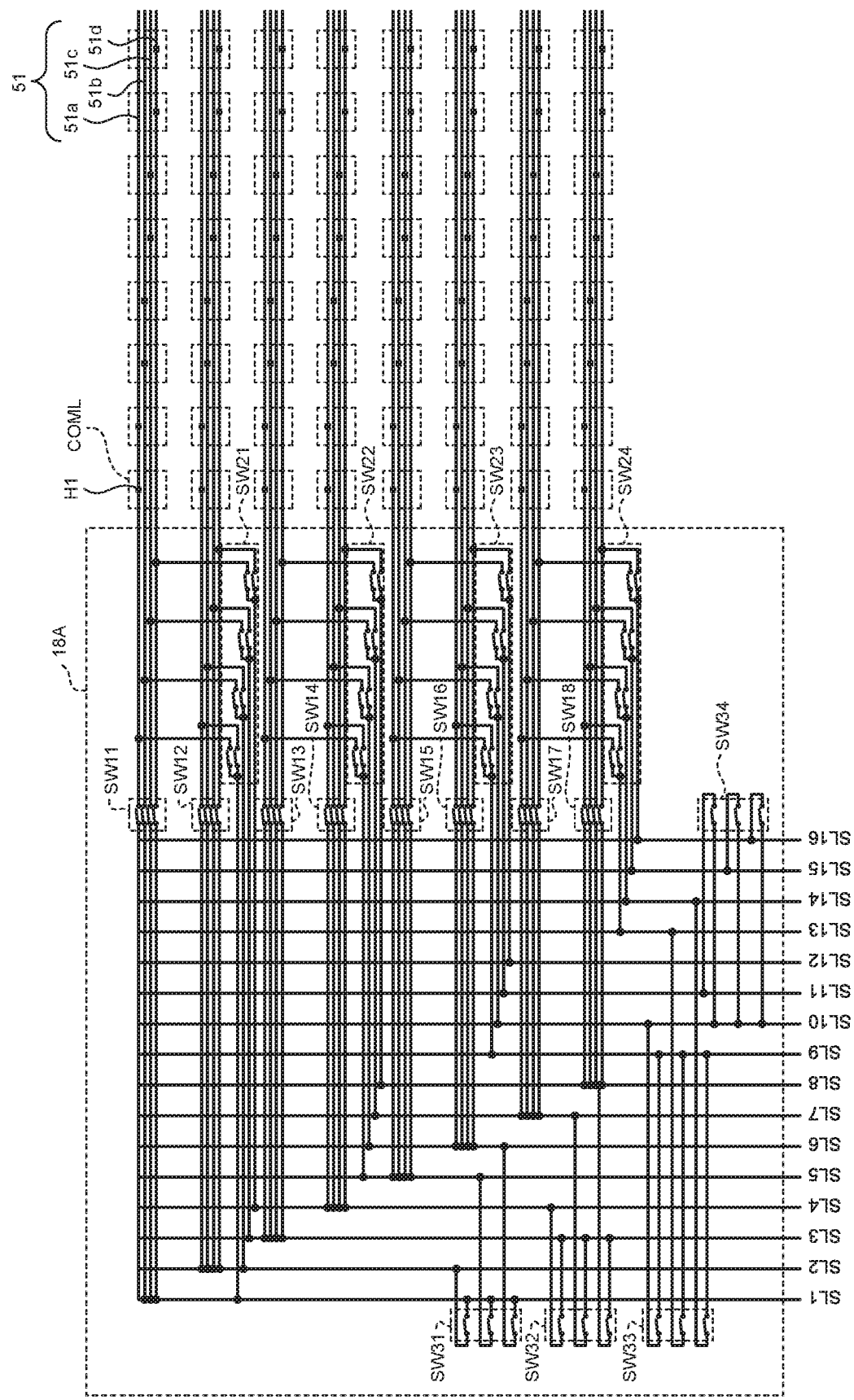
FIG. 35 is a diagram of an exemplary configuration of the coupling circuit according to the second embodiment.

FIG. 35 is a diagram of an exemplary configuration of the coupling circuit according to the second embodiment. As illustrated in FIG. 35, the coupling circuit 18A according to the second embodiment includes a plurality of switching elements SW11 to SW18, SW21 to SW24, and SW31 to SW34. The switching elements SW11 to SW18, SW21 to SW24, and SW31 to SW34 are coupled to the respective wires 51. Coupling between the drive electrodes COML can be switched by the switching elements SW11 to SW18, SW21 to SW24, and SW31 to SW34.

As described in the first embodiment, when the switching elements SW11 to SW18 are turned on, and the switching elements SW21 to SW24 are turned off, the drive electrodes COML are coupled to one another in the row direction to serve as the drive electrode blocks COMLA (refer to FIG. 24). When the switching elements SW11 to SW18 are turned off, and the switching elements SW21 to SW24 are turned on, the drive electrodes COML are coupled to one another in the row direction and the column direction to serve as the drive electrode blocks COMLB (refer to FIG. 25).

When the switching elements SW11 to SW18 are turned off, and the switching elements SW21 to SW24 and SW31 to SW34 are turned on, the drive electrodes COML according to the second embodiment are coupled to one another in the row direction and the column direction to serve as the drive electrode blocks COMLC (refer to FIG. 34). Drive electrodes COML disposed side by side in the row direction and the column direction, for example, are coupled to one another to serve as one drive electrode block COMLC including 16 drive electrodes COML. In FIG. 35, four drive electrode blocks COMLC are formed out of the 64 drive electrodes COML. The drive electrode block COMLC has a rectangular or square shape in planar view. The four drive electrode blocks COMLC are coupled to, for example, the detection data lines SL1, SL3, SL9, and SL10 via the switching elements SW21 to SW24 and SW31 to SW34.

Figure 36:
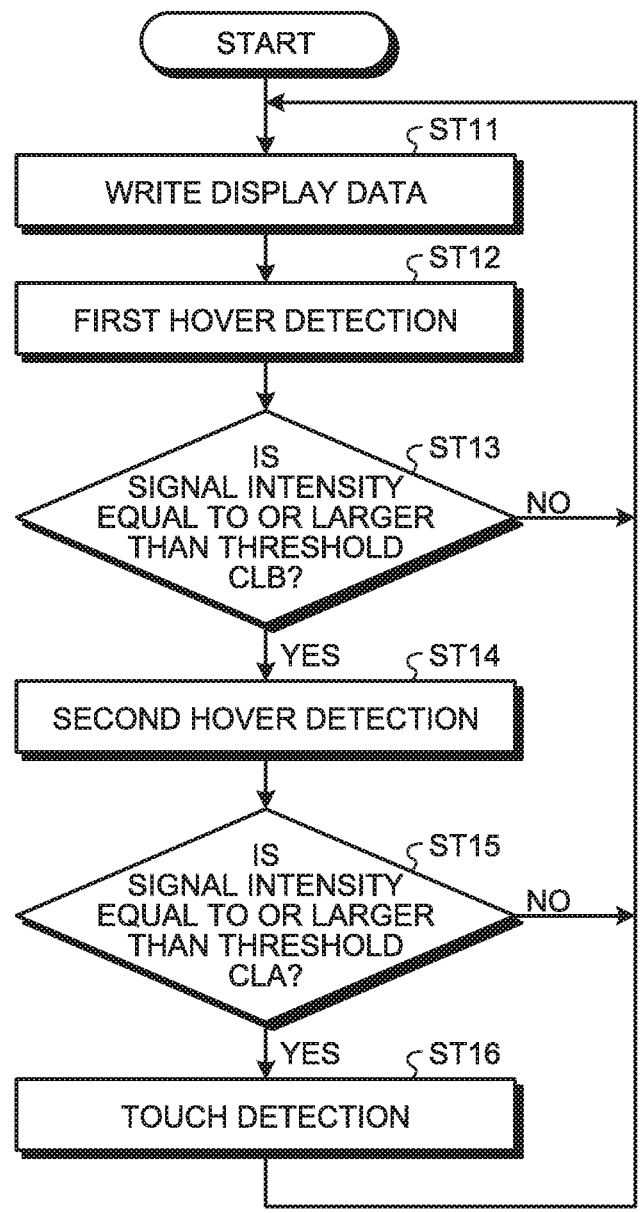
FIG. 36 is a flowchart of the detection operation according to the second embodiment.
Figure 37:
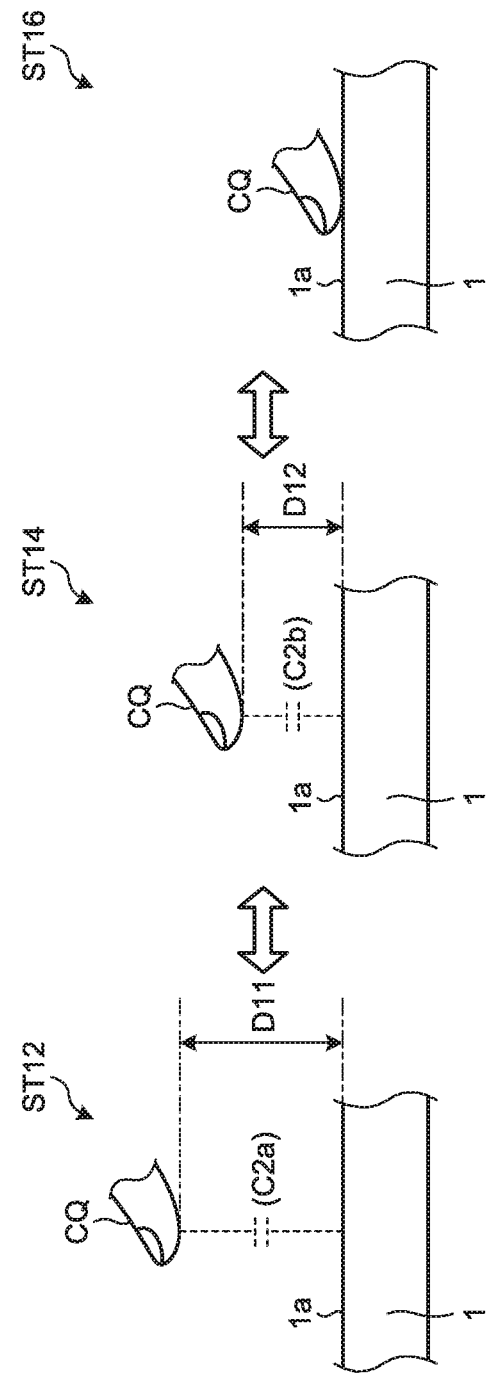
FIG. 37 is a diagram for schematically explaining the relation between the display device and the object to be detected in first hover detection, second hover detection, and touch detection.

The following describes a specific example of the detection operation according to the second embodiment. FIG. 36 is a flowchart of the detection operation according to the second embodiment. FIG. 37 is a diagram for schematically explaining the relation between the display device and the object to be detected in first hover detection, second hover detection, and touch detection. As illustrated in FIG. 28, the detection operation periods Pt1 and Pt2 according to the second embodiment each have the self-capacitance hover detection period and the mutual capacitance touch detection period. Step ST11 corresponds to the display operation period Pd1 or Pd2. Steps ST12 and ST13 correspond to a first hover detection period in the detection operation period Pt1 or Pt2. Steps ST14 and ST15 correspond to a second hover detection period in the detection operation period Pt1 or Pt2. Step ST16 corresponds to the touch detection period in the detection operation period Pt1 or Pt2.

At Step ST11 in FIG. 36, similarly to Step ST1 according to the first embodiment, the controller 11 (refer to FIG. 1) causes the gate driver 12 (refer to FIG. 1), the source driver 13 (refer to FIG. 1), and the drive electrode driver 14 (refer to FIG. 1) to write display data to the display panel 10 (refer to FIG. 1).

At Step ST12, the drive electrode driver 14 and the detector 40 (refer to FIG. 1) perform first hover detection. As illustrated in FIG. 37, the object to be detected CQ is in the non-present state or the non-contact state with respect to the display surface 1a of the display device 1 in the first hover detection (Step ST12). The object to be detected CQ is positioned away from the display surface 1a by a distance D11. Capacitance C2a is formed between the object to be detected CQ and the drive electrodes COML (not illustrated).

The first hover detection is performed by the self-capacitance method using the drive electrode blocks COMLC as detection electrodes. Specifically, the drive electrode driver 14 transmits the control signals to the coupling circuit 18A (refer to FIG. 35), thereby turning off the switching elements SW11 to SW18 and turning on the switching elements SW21 to SW24 and SW31 to SW34. As a result, the drive electrodes COML serve as the drive electrode blocks COMLC (C11, C12, C21, and C22) as illustrated in FIG. 34. In this state, the drive electrode driver 14 supplies the detection drive signals Vcom to the detection data lines SL1, SL3, SL9, and SL10 of the coupling circuit 18.

The drive electrode driver 14, for example, supplies the detection drive signals Vcom having the same waveform synchronously to the detection data lines SL1, SL3, SL9, and SL10. As a result, the detection signals Vdet2 based on capacitance changes in the drive electrode blocks COMLC are output from the respective drive electrode blocks COMLC simultaneously.

The detector 40 acquires the detection signals Vdet2 output from the respective drive electrode blocks COMLC via the detection data lines SL1, SL3, SL9, and SL10. At Step ST12, the detector 40 performs arithmetic processing based on the acquired detection signals Vdet2 and determines whether the object to be detected is present in the first hover detection based on the result of the arithmetic processing.

Figure 38:
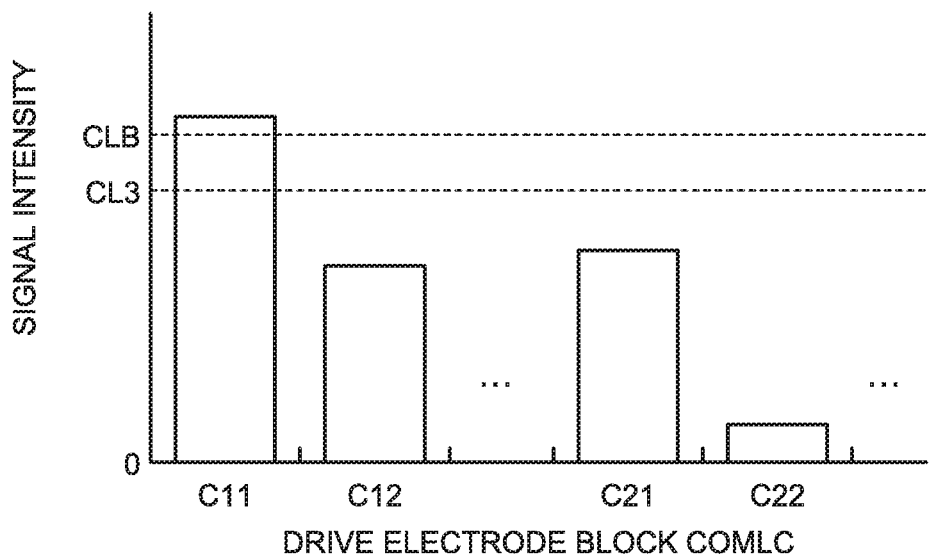
FIG. 38 is a diagram of an example of the thresholds according to the second embodiment.
Figure 39:
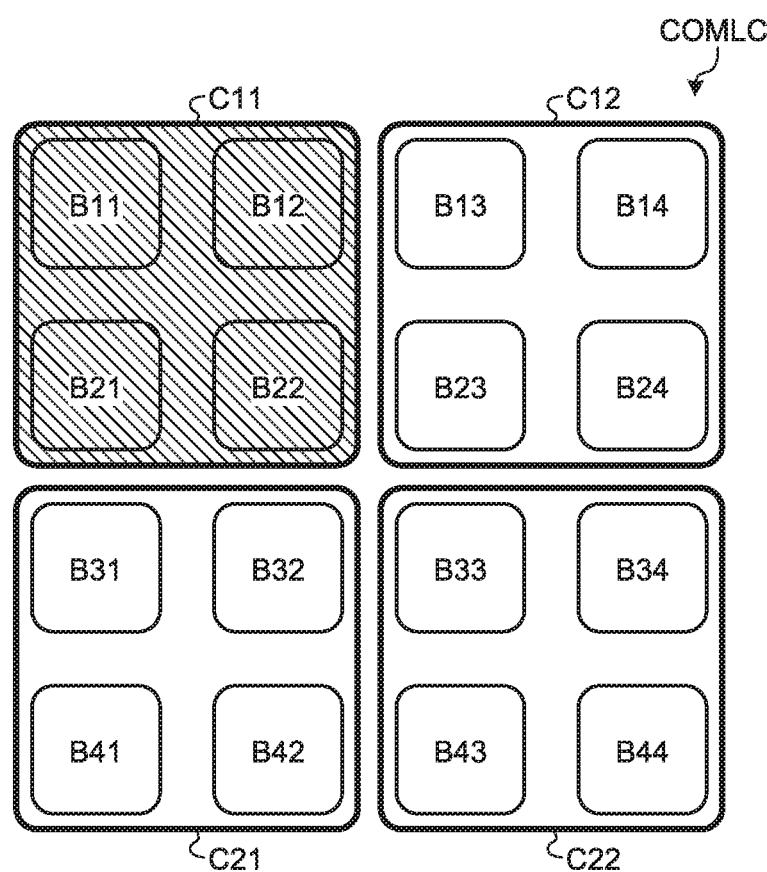
FIG. 39 is a diagram of an example of a detection position of the object to be detected in the first hover detection.

FIG. 38 is a diagram of an example of the thresholds according to the second embodiment. The horizontal axis of FIG. 38 indicates the position of the drive electrode blocks COMLC. The vertical axis of FIG. 38 indicates the signal intensity. The signal intensity corresponds to the difference (absolute value $|\Delta VC|$) of the detection signal Vdet2 output from the drive electrode block COMLC. CL3 in the vertical axis of FIG. 38 indicates a threshold for the first hover detection performed using the drive electrode blocks COMLC as detection electrodes. CLB in the vertical axis of FIG. 38 indicates a threshold for determining whether it is necessary to perform the second hover detection performed using the drive electrode blocks COMLB as detection electrodes. The threshold CLB is equal to or larger than the threshold CL3 (CLB≥CL3). FIG. 39 is a diagram of an example of a detection position of the object to be detected in the first hover detection. In the first hover detection illustrated in FIGS. 38 and 39, the object to be detected is detected based on the difference |ΔVC| of the detection signal Vdet2 output from the drive electrode block COMLC (C11) out of the drive electrode blocks COMLC (C11, C12, C21, and C22).

The signal processor 44 (refer to FIG. 2) of the detector 40 compares the differences |ΔVC| of the detection signals Vdet2 output from the respective drive electrode blocks COMLC with the predetermined threshold CL3. For example, as illustrated in FIGS. 38 and 39, if one or more of the differences |ΔVC| of the detection signals Vdet2 output from the respective drive electrode blocks COMLC are equal to or larger than the threshold CL3, the signal processor 44 determines that the object to be detected is detected in the first hover detection. In the example illustrated in FIGS. 38 and 39, the signal processor 44 determines that the object to be detected is detected in the drive electrode block COMLC (C11). In this case, the coordinate extractor 45 (refer to FIG. 2) of the detector 40 determines the position of the drive electrode block COMLC (C11) on the display panel 10 to be the position of the object to be detected CQ in the first hover detection. By contrast, if all the differences |ΔVB| of the detection signals Vdet2 output from the respective drive electrode blocks COMLC are smaller than the threshold CL3, the signal processor 44 determines that the object to be detected is not detected in the first hover detection.

At Step ST13 in FIG. 36, the detector 40 determines whether it is necessary to perform the second hover detection based on the detection signals Vdet2 acquired in the first hover detection (Step ST12). In other words, the detector 40 predicts whether the object to be detected can be detected if it performs the second hover detection based on the detection result of the first hover detection. If the detector 40 predicts that the object to be detected can be detected in the second hover detection, the detector 40 performs the second hover detection.

Specifically, the signal processor 44 (refer to FIG. 2) of the detector 40 compares the differences |ΔVC| of the detection signals Vdet2 output from the respective drive electrode blocks COMLC with the threshold CLB. If one or more of the differences |ΔVC| of the detection signals Vdet2 output from the respective drive electrode blocks COMLC are equal to or larger than the threshold CLB, the signal processor 44 determines that it is necessary to perform the second hover detection. In the example illustrated in FIGS. 38 and 39, the object to be detected CQ is detected at intensity higher than the threshold CLB in the drive electrode block COMLC (C11). As a result, the signal processor 44 determines that it is necessary to perform the second hover detection by the mutual capacitance method. By contrast, if all the differences |ΔVC| of the detection signals Vdet2 output from the respective drive electrode blocks COMLC are smaller than the threshold CLB, the signal processor 44 determines that it is not necessary to perform the second hover detection.

If the signal processor 44 determines that it is necessary to perform the second hover detection (Yes at Step ST13), the process proceeds to Step ST14. If the signal processor 44 determines that it is not necessary to perform the second hover detection (No at Step ST13), the process is returned to Step ST11.

At Step ST14, the drive electrode driver 14 and the detector 40 (refer to FIG. 1) perform the second hover detection. As illustrated in FIG. 37, the object to be detected CQ is in the non-contact state with respect to the display surface 1a of the display device 1 in the second hover detection (Step ST14) but is positioned closer to the display surface 1a than in the first hover detection. The object to be detected CQ is positioned away from the display surface 1a by a distance D12. The distance D12 is smaller than the distance D11. Capacitance C2b is formed between the object to be detected CQ and the drive electrodes COML (not illustrated). The capacitance C2b is larger than the capacitance C2a.

Similarly to Step ST2 according to the first embodiment, the second hover detection is performed by the self-capacitance method using the drive electrode blocks COMLB as detection electrodes. Specifically, the drive electrode driver 14 transmits the control signals to the coupling circuit 18A (refer to FIG. 35), thereby turning off the switching elements SW11 to SW18, turning on the switching elements SW21 to SW24, and turning off the switching elements SW31 to SW34. As a result, one drive electrode block COMLC is divided into four drive electrode blocks COMLB electrically separated from one another. In this state, the drive electrode driver 14 supplies the detection drive signals Vcom to the detection data lines SL1 to SL16 of the coupling circuit 18A. As a result, the detection signals Vdet2 based on capacitance changes in the drive electrode blocks COMLB are output from the respective drive electrode blocks COMLB simultaneously.

The detector 40 acquires the detection signals Vdet2 output from the respective drive electrode blocks COMLB via the detection data lines SL1 to SL16. At Step ST15, the detector 40 performs arithmetic processing based on the acquired detection signals Vdet2 and determines whether the object to be detected is present in the second hover detection based on the result of the arithmetic processing. If the object to be detected is detected in the second hover detection, the detector 40 determines the position of the object to be detected. The method for determining whether the object to be detected is present in the second hover detection and the method for determining the position thereof are the same as those performed at Step ST2 according to the first embodiment.

Based on the detection signals Vdet2 acquired in the second hover detection (Step ST14), the detector 40 determines whether it is necessary to perform mutual capacitance touch detection (Step ST15). The determination method performed at Step ST15 is the same as that performed at Step ST3 according to the first embodiment. If the detector 40 determines that it is necessary to perform mutual capacitance touch detection (Yes at Step ST15), the process proceeds to Step ST16. If the detector 40 determines that it is not necessary to perform mutual capacitance touch detection (No at Step ST15), the process is returned to Step ST11.

At Step ST16, the drive electrode driver 14 and the detector 40 perform touch detection. As illustrated in FIG. 37, the object to be detected CQ is in the contact state with respect to the display surface 1a of the display device 1 in touch detection (Step ST16). Capacitance formed between the object to be detected CQ and the drive electrodes COML (not illustrated) is larger than each of the capacitance C2a and the capacitance C2b.

Similarly to Step ST4 according to the first embodiment, touch detection is performed by the mutual capacitance method using the drive electrode blocks COMLA as detection electrodes. Specifically, the drive electrode driver 14 turns on the switching elements SW11 to SW18 and turns off the switching elements SW21 to SW24 and SW31 to SW34 of the coupling circuit 18A. As a result, the drive electrodes COML serve as the drive electrode blocks COMLA. The processing performed thereafter is the same as that performed at Step ST4 according to the first embodiment. The drive electrode driver 14 supplies the detection drive signals Vcom having the same waveform to the detection data lines SL1 to SL16 at respective different timings. As a result, the detection signals Vdet1 are sequentially output from the touch detection electrodes TDL based on changes in capacitance between the drive electrode blocks COMLA and the touch detection electrodes TDL. The detector 40 acquires the detection signals Vdet1 output from the respective touch detection electrodes TDL via the detection data lines SL1 to SL16. Based on the acquired detection signals Vdet1, the detector 40 determines whether the object to be detected is present in touch detection. After Step ST16, the process is returned to Step ST11.

The controller 11 according to the second embodiment changes the number of drive electrodes COML included in one drive electrode block COML based on the detection signals Vdet2. If the difference |ΔVC| of the detection signal Vdet2 is equal to or larger than the threshold CLB in the first hover detection (Step ST12) using the drive electrode blocks COMLC (Yes at Step ST13), for example, the drive electrode driver 14 and the detector 40 perform the second hover detection (Step ST14) using the drive electrode blocks COMLB including a smaller number of electrodes than that of the drive electrode blocks COMLC. With this configuration, the electrode size of one drive electrode block in the first hover detection is larger than that in the second hover detection. Even if the distance D1 (refer to FIG. 19) between the object to be detected CQ and the display surface 1a is large, the detector 40 can detect the object to be detected CQ with high sensitivity. Furthermore, the number of drive electrode blocks per unit area in the second hover detection is larger than that in the first hover detection, resulting in higher detection resolution.

The second embodiment may also employ the modification described in the first embodiment. Specifically, if the difference |ΔVC| of the detection signal Vdet2 output from the drive electrode block COMLC is smaller than the threshold CL3 in the first hover detection (Step ST12), the display panel 10 may display a notice for urging the user to bring his/her hand closer at the next step ST11. As a result, the user may possibly bring his/her hand closer to the touch sensor 30. If the hand comes closer to the touch sensor 30, and the intensity of the difference |ΔVC| of the detection signal Vdet2 output from the drive electrode block COMLC is equal to or larger than the threshold CL3, the signal processor 44 determines that the object to be detected CQ is detected in the first hover detection. As a result, the user can perform hover input.

In the second embodiment, the drive electrode blocks COMLB and COMLC each correspond to the "second drive electrode block" according to the present disclosure. The device including the drive electrodes COML, the touch detection electrodes TDL, the detector 40, and the coupling circuit 18A corresponds to the "detection device" according to the present disclosure.

While exemplary embodiments according to the present invention have been described, the embodiments are not intended to limit the invention. The contents disclosed in the embodiments are given by way of example only, and various changes may be made without departing from the spirit of the present invention. While the first embodiment describes a liquid crystal display device that can perform color display, for example, the present invention is not necessarily applied to a color display liquid crystal display device and may be a monochromatic display liquid crystal display device. Appropriate changes made without departing from the spirit of the present invention naturally fall within the technical scope of the invention.

The detection device and the display device according to the present aspect may have the following aspects, for example.

(1) A detection device comprising:
a plurality of first electrodes disposed side by side in a first direction and a second direction intersecting the first direction;
a plurality of second electrodes disposed on a side facing the first electrodes and extending in the second direction;
a detector configured to receive a first detection signal output from the second electrodes based on a change in capacitance between the first electrodes and the second electrodes or a second detection signal output from the first electrodes based on a change in capacitance in the first electrodes; and
a coupling circuit configured to couple the first electrodes to one another in the first direction to form a first drive electrode block in a period when the detector receives the first detection signal and couple at least two or more of the first electrodes to one another in at least the second direction to form a second drive electrode block in a period when the detector receives the second detection signal.

(2) The detection device according to (1), wherein
the coupling circuit couples at least two or more of the first electrodes to one another in the first direction and the second direction to form the second drive electrode block, and
the second drive electrode block has a larger number of first electrodes arrayed in the second direction than the number of first electrodes arrayed in the second direction of the first drive electrode block.

(3) The detection device according to (1) or (2), further comprising:
a drive circuit configured to supply a drive signal to the first electrodes, wherein
the first detection signal is output from the second electrodes when the drive signal is supplied to the first electrodes, and
the second detection signal is output from the first electrodes when the drive signal is supplied to the first electrodes.

(4) The detection device according to (3), wherein the drive circuit supplies, to the second electrodes, a guard signal having the same waveform as a waveform of the drive signal and synchronized with the drive signal in the period when the detector receives the second detection signal.

(5) The detection device according to any one of (1) to (3), wherein the second electrodes are not electrically coupled to any component in the period when the detector receives the second detection signal.

(6) The detection device according to any one of (1) to (5), further comprising:
a plurality of wires coupled to the first electrodes, wherein
the coupling circuit includes a switching element configured to couple or cut off between a first wire and a second wire of the wires.

(7) The detection device according to any one of (1) to (6), further comprising:
a controller configured to control the coupling circuit, wherein the controller changes the number of first electrodes included in one second drive electrode block based on the second detection signal.

(8) A display device comprising:
the detection device according to any one of (1) to (7);
a substrate having a display region and a frame region surrounding the display region; and
a display functional layer configured to display an image in the display region, wherein
the first electrodes are provided in the display region.

(9) A display device comprising:
the detection device according to (1);
a substrate having a display region and a frame region surrounding the display region; and
a display functional layer configured to display an image in the display region, wherein
the first electrodes are provided in the display region, and
the coupling circuit is disposed in the frame region.

What is claimed is:

1. A detection device comprising:
a plurality of first electrodes disposed side by side in a first direction and a second direction intersecting the first direction;
a plurality of second electrodes disposed on a side facing the first electrodes and extending in the second direction; and
a detection circuit,
wherein in a first detection signal period,
the first electrodes arrayed in the first direction among the plurality of first electrodes are electrically coupled to form a first drive electrode block,
a first drive signal is supplied to the first drive electrode block, and
the detection circuit is configured to detect a first detection signal output from the second electrode in response to a change in capacitance between the first drive electrode block and the second electrode, and
in a second detection signal period,
at least two or more of the first electrodes arrayed in the second direction among the plurality of first electrodes are electrically coupled to form a second drive electrode block,
a second drive signal is supplied to the second drive electrode block, and
the detection circuit is configured to detect a second detection signal output from the second drive electrode block in response to a change in capacitance in the second drive electrode block.

2. The detection device according to claim 1, further comprising a coupling circuit, wherein
the coupling circuit couples at least two or more of the first electrodes to one another in the first direction and the second direction to form the second drive electrode block, and
the second drive electrode block has a larger number of first electrodes arrayed in the second direction than the number of first electrodes arrayed in the second direction of the first drive electrode block.

3. The detection device according to claim 1, further comprising a drive circuit configured to supply the first drive signal to the first drive electrode block and the second drive signal to the second drive electrode block,
wherein
the first detection signal is output from the second electrodes when the first drive signal is supplied to the first drive electrode block, and
the second detection signal is output from the second drive electrode block when the second drive signal is supplied to the second drive electrode block.

4. The detection device according to claim 3, wherein the drive circuit supplies, to the second electrodes, a guard signal having the same waveform as a waveform of the second drive signal and synchronized with the second drive signal in the second detection signal period when the detection circuit detects the second detection signal.

5. The detection device according to claim 1, wherein
the second electrodes are not electrically coupled to any component in the second detection signal period when the detection circuit detects the second detection signal.

6. The detection device according to claim 2, further comprising
a plurality of wires coupled to the first electrodes, wherein
the coupling circuit includes a switching element configured to couple or cut off between a first wire and a second wire of the wires.

7. The detection device according to claim 2, further comprising:
a controller configured to control the coupling circuit, wherein
the controller changes the number of first electrodes included in one second drive electrode block based on the second detection signal.

8. A display device comprising:
a detection device;
a substrate having a display region and a frame region surrounding the display region; and
a display functional layer configured to display an image in the display region, wherein the detection device comprises:
a plurality of first electrodes disposed side by side in a first direction and a second direction intersecting the first direction, the first electrodes being provided in the display region;
a plurality of second electrodes disposed on a side facing the first electrodes and extending in the second direction; and
a detection circuit,
wherein in a first detection signal period,
the first electrodes arrayed in the first direction among the plurality of first electrodes are electrically coupled to form a first drive electrode block,
a first drive signal is supplied to the first drive electrode block, and
the detection circuit is configured to detect a first detection signal output from the second electrode in response to a change in capacitance between the first drive electrode block and the second electrode, and
in a second detection signal period,
at least two or more of the first electrodes arrayed in the second direction among the plurality of first electrodes are electrically coupled to form a second drive electrode block,
a second drive signal is supplied to the second drive electrode block, and
the detection circuit is configured to detect a second detection signal output from the second drive electrode block in response to a change in capacitance in the second drive electrode block.

9. The display device according to claim 8, further comprising:

a coupling circuit configured to form the first drive electrode block in the first detection signal period and the second drive electrode block in the second detection signal period;

wherein the coupling circuit is disposed in the frame region.

* * * * *